(12) United States Patent
Ogawa

(10) Patent No.: US 6,626,468 B2
(45) Date of Patent: Sep. 30, 2003

(54) PIPE JOINT, ITS MANUFACTURING METHOD, AND FLUID DEVICE USING THE SAME

(75) Inventor: Minoru Ogawa, Tagata-gun (JP)

(73) Assignee: Toshiba TEC Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/911,707

(22) Filed: Jul. 25, 2001

(65) Prior Publication Data
US 2002/0043801 A1 Apr. 18, 2002

(30) Foreign Application Priority Data

Jul. 27, 2000 (JP) ........................................ 2000-226409
Jul. 3, 2001 (JP) ........................................ 2001-201551

(51) Int. Cl.$^7$ ............................................... B23P 25/00
(52) U.S. Cl. ............................... 285/125.1; 285/126.1; 29/890.09; 29/527.1; 29/527.2; 29/527.3
(58) Field of Search .................... 285/125.1, 126.1; 29/890.09, 527.1, 527.2, 527.3, DIG. 5, DIG. 10

(56) References Cited

U.S. PATENT DOCUMENTS 3,430,338 A  *  3/1969  Flaherty ....................... 29/839
3,433,413 A  *  3/1969  Berleyoung et al. ........... 236/82
3,470,893 A  * 10/1969  Nelson ..................... 137/68.11
3,650,551 A  *  3/1972  Akers ....................... 285/143.1
3,798,727 A  *  3/1974  Brock ....................... 29/890.09
4,121,613 A  * 10/1978  Reinhard et al. ............ 137/351
5,640,995 A  *  6/1997  Packard et al. .............. 137/597
5,840,417 A  * 11/1998  Bolger ........................ 428/323
5,904,776 A  *  5/1999  Donde et al. ................ 118/500
5,920,986 A  *  7/1999  Brooks et al. .............. 29/893.2
5,964,239 A  * 10/1999  Loux et al. ............... 137/15.21
5,980,742 A  * 11/1999  Saitoh ..................... 210/198.2
6,286,206 B1 *  9/2001  Li ................................ 29/840
6,419,476 B1 *  7/2002  Ouellette .................... 425/567

FOREIGN PATENT DOCUMENTS

JP        2000-141300         5/2000

* cited by examiner

Primary Examiner—Lynne H. Browne
Assistant Examiner—James M. Hewitt
(74) Attorney, Agent, or Firm—Oblon, Spivak, McClelland, Maier & Neustadt, P.C.

(57) ABSTRACT

A pipe joint is made by filling resin in at least an inside of a hole passed through the substrate and opened at the substrate's surface. A resin die is formed projected out of the surface of the substrate. A layer-form member is formed integrally at the surface of the substrate and side surface of the resin die. The resin forming the resin die is removed so as to integrally form the hollow projection communicating with the hole at the surface of the substrate.

6 Claims, 36 Drawing Sheets

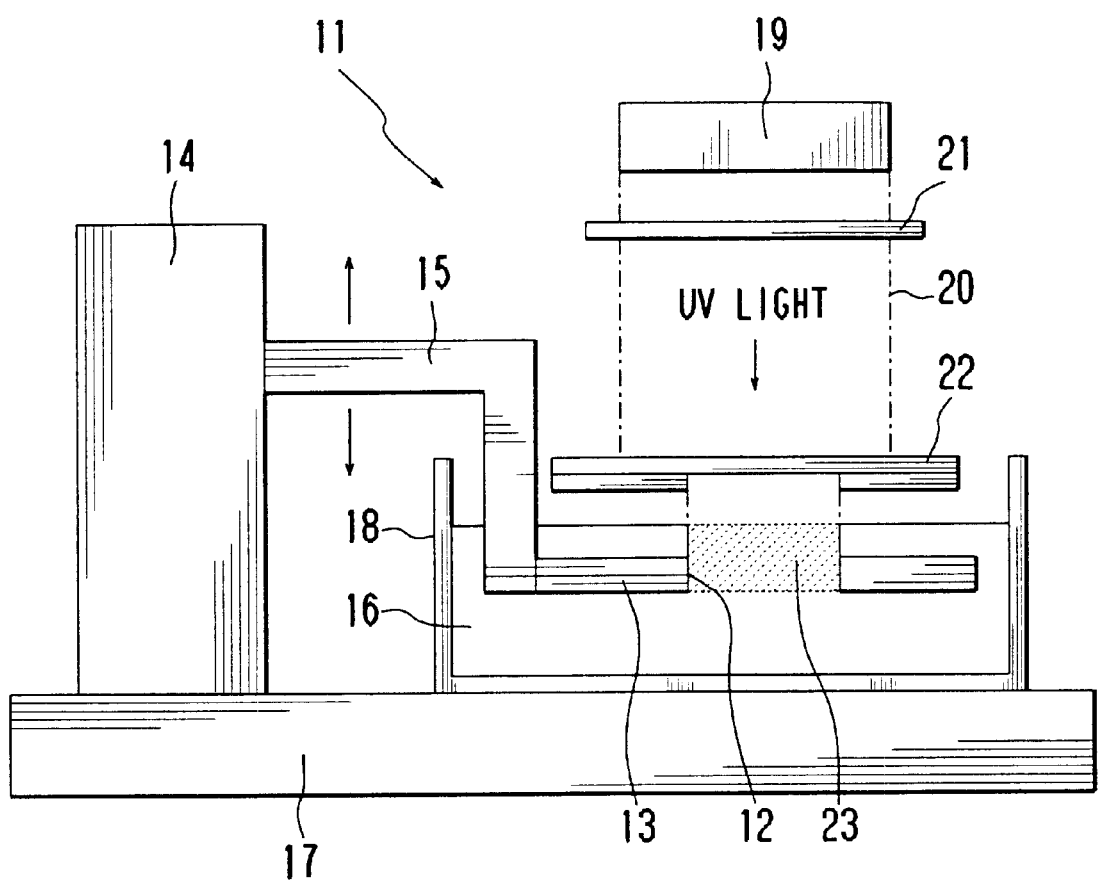

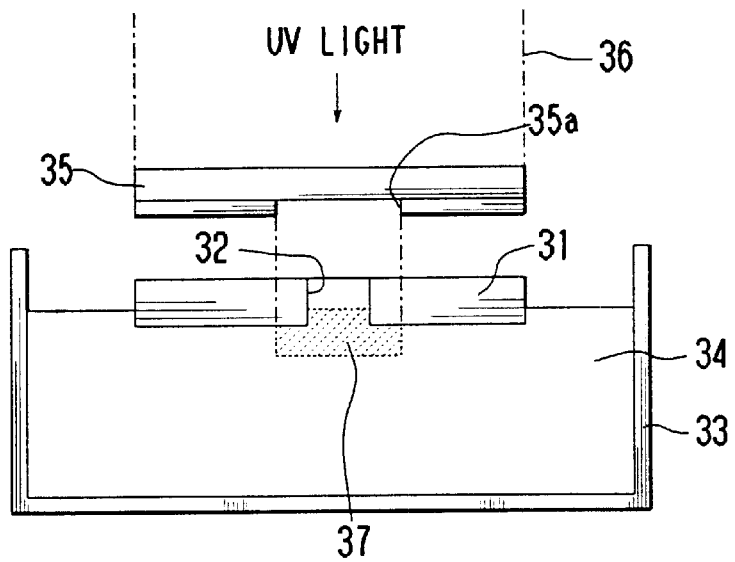
Fig. 11
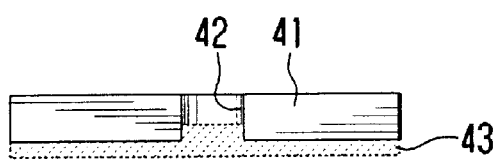
Fig. 12A
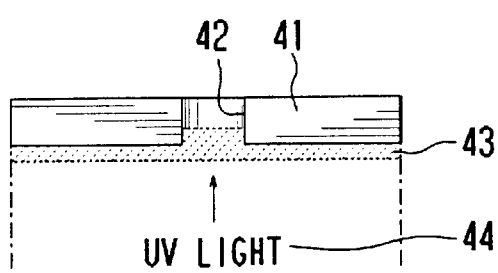
Fig. 12B
Fig. 12C
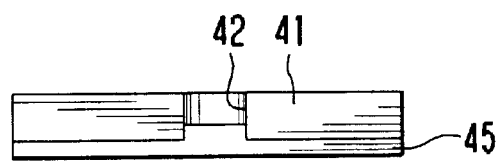
Fig. 12D
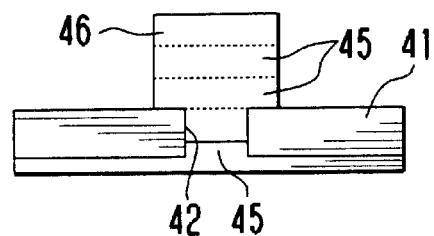

Fig. 31A
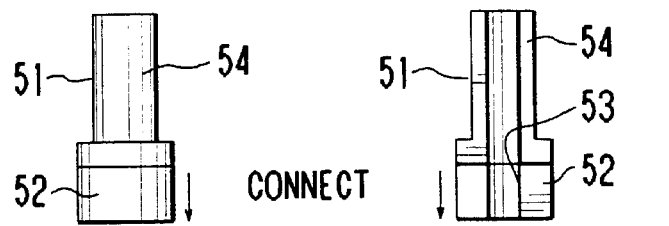
Fig. 31B
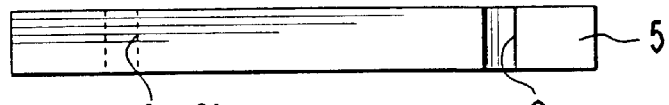
Fig. 31C
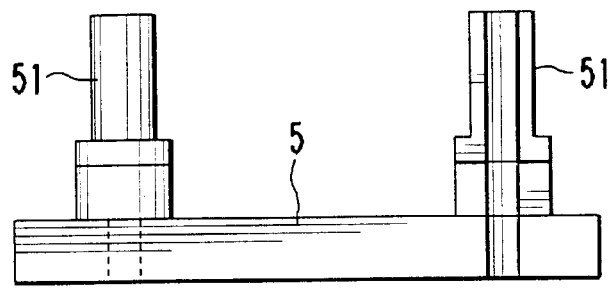
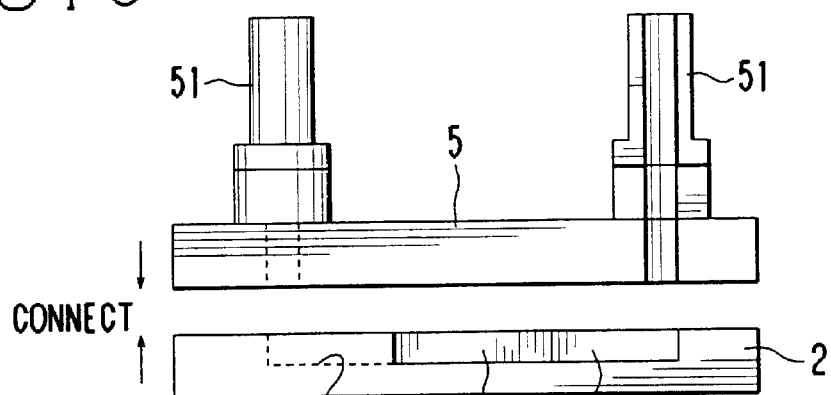
Fig. 31D
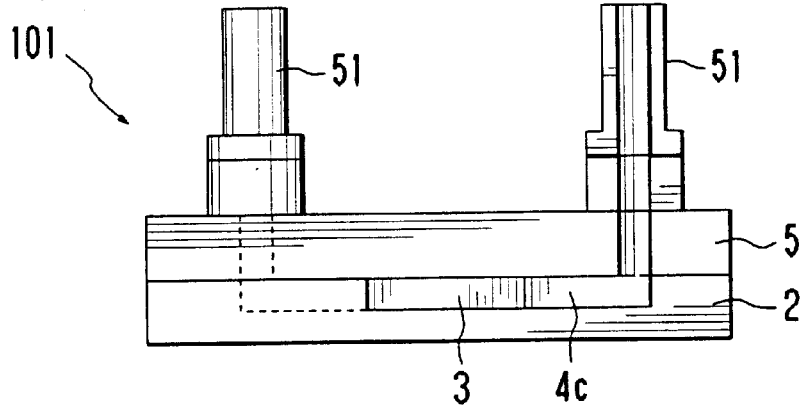

PIPE JOINT, ITS MANUFACTURING METHOD, AND FLUID DEVICE USING THE SAME

CROSS REFERENCE TO RELATED APPLICATIONS

The present application is based on Japanese Priority Documents 2000-226409 filed on Jul. 27, 2000 and 2001-201551 filed on Jul. 3, 2001, the content of which is incorporated herein by reference.

BACKGROUND OF THE INVENTION

1. Field of the Invention

This invention relates to a pipe joint acting as a hollow connecting segment for use in connecting a tube to a fluid inlet and a fluid outlet of a fluid device in the field of micro-machine and MEMS (Micro Electro Mechanical System, in particular, and its manufacturing method as well as the fluid device.

2. Discussion of the Background

At present, a miniature-sized machine called as a micro-machine or MEMS has been earnestly studied and developed in each of the nations in the world. Such a miniature-sized machine has been realized as a micro-machine (such as a motor or the like) under application of an ultra-fine machining technology for a semiconductor device and then gathered world's attention at once. It is normally said that the miniature-sized machine represented by MEMS under utilization of a semiconductor process (such as an etching or a lithography) generally eliminates assembling work or adjustment process, whereby a system having some electronic circuits or sensors integrated therein can be realized on one substrate.

As an applied technology based on the aforesaid MEMS system, $\mu$-TAS (Micro Total Analysis Systems) have been introduced for reduction in size of conventional large-scaled chemical analysis system and biochemical analysis system, and several developments have been reported on micro-fluid devices such as various kinds of micro-valves, micro-pumps, reaction channels and separation columns. In addition, the MEMS technology has been applied not only to the aforesaid analysis system but also to reduction in size of the chemical reactor realizing a chemical reaction or bio-chemical synthesis, resulting in that application of the MEMS technology to the fluid device has been remarkably expanded and activated.

The usual type of fluid device is constructed such that it has a fluid inlet for use in feeding fluid into the device and a fluid outlet for use in discharging fluid out of the device, some tubes are connected to the fluid inlet and the fluid outlet and the fluid is supplied to or discharged from the tube. Due to this fact, the fluid inlet and the fluid outlet require some joints (hollow projections) to which the tubes can be connected.

The present technology on a semiconductor (MEMS) is still yet restricted in a two-dimensional region and it is quite difficult to make a sufficient hollow projection for connecting a tube. Due to this fact, the conventional type of fluid device is presently constructed such that a commercially available joint (a coupling) is adhered to a hole formed at a lid member of the fluid device with adhesive agent to form the fluid inlet and the fluid outlet.

That is, the micro-fluid device reported up to now has been mainly developed for its major segment and a quite less number of reports about the inlet and the outlet have been found. Although the fluid device by itself is manufactured by MEMS technology as well as an ultra fining machining technology and a coupling technology mainly for glass (also including quartz) and a monolithic silicon (Si), the inlet and the outlet are constructed such that the commercially available joint is connected to the holes of the fluid device (the inlet and the outlet) with adhesive agent.

Referring now to FIGS. 39 and 40, the prior art fluid device will be described in brief. The device illustrated herein is a micro-reaction chamber 200 having a quite simple structure. A base 201 is comprised of a monolithic silicon, wherein a flow passage 202 and a reaction chamber 203 as shown are formed like a recess by etching work. A lid 204 is made of glass, and holes 205 which open in its front and rear direction are formed to be positioned at the end portions of each of the flow passages 202 of the base 201. In addition, joints 206 made of commercially available synthetic resin or metal are adhered to the holes 205 by adhesive agent 207. The lid 204 and the base 201 are adhered to each other by an anode connection not using any adhesive agent to complete the micro-reaction chamber 200.

In general, in the case of anodic coupling between silicon and glass, its substrate temperature is required to show several hundred ° C., so that the joints 206 are adhered after connection between the lid 204 and the base 201 in view of heat-resistant temperature of the adhesive agent 207 or the joint material. The joints 206 may become the fluid inlets 206a, 206b and the fluid outlet 206c, wherein the fluids A and B are introduced to the reaction chamber 203 through each of the fluid inlets 206a, 206b, reacted to each other in the reaction chamber 203, thereafter the reacted fluid becomes fluid C and the fluid C is discharged out of the outlet 206c.

A general type of fluid device manufactured by MEMS process is constituted by silicon and glass (also including SiO2, quartz) where adhesive-less connection (fluoric acid connecting, anodic connecting and direct connecting) can be carried out. It is because, in the case of applying adhesive agent, there occurs a possibility that a reactor, a mixer, a flow passage and a valve or the like formed in small-size by MEMS process may become inferior due to squeezing-out of the adhesive agent or a permanent reliability at the connecting part with the adhesive agent is not excellent (leakage of fluid). As described above, irrespective of the fact that the device part is assembled by adhesive-less connection, the method for adhering the commercially available joint 206 with adhesive agent 207 is applied for inlets and outlets of many types of fluid device.

Some problems found in the prior art will be described as follows.

Since the commercially available joint is quite large in size as compared with that of the fluid device manufactured in quite small size using the semiconductor technology, the size of the device itself is made large only for adhering the joint to the device irrespective of the fact that the device can be made originally small in size. In addition, there are many problems such as closing of the hole under application of the adhesive agent, a connecting strength of the joint, contamination of fluid, a problem of heat-resistance and deterioration of easiness in manufacturing or the like. Such a present situation is a major cause not capable of attaining a high merit of making ultra fine formation or miniature-sized structure which is the major feature of the semiconductor (MEMS) technology and a reduction in manufacturing cost in batch process [a total assembling can be carried out in a unit of wafer (several hundred pieces and several thousand pieces)].

That is, as long as the conventional commercially available joint is used, the sizes of the inlet and outlet are not reduced even if the fluid device is set to have a miniature-size (micro-formation), so that a certain limitation may occur in a miniature-sized device. In addition, the connecting process using adhesive agent may cause the hole of the device to be clogged (squeezing-out of adhesive agent) and this is not a preferable one in view of reliability (in particular, reliability in shielding of fluid and leakage of fluid out of shield part). Further, adhesive agent may produce contamination of fluid in the fluid device (in particular, this is a severe problem in the analysis system). Additionally, there occurs a problem that the adhesive agent restricts limitation of fluid device against heat-resistance and anti-chemical product.

Due to this fact, in the field of the fluid device manufactured under application of the semiconductor (MEMS) technology in particular, it is desired to realize a method for forming the inlet and outlet directly in the hole of the fluid device, a quite small joint (a micro-fluid joint), a joint capable of coupling without applying any adhesive agent, a joint structure adapted for a batch process and its manufacturing method.

SUMMARY OF THE INVENTION

It is an object of the present invention to provide a pipe joint having a joint structure capable of connecting operation without applying any adhesive agent, its manufacturing method and a fluid device using the same.

These and further objects of the present invention are achieved by the novel pipe joint, method for manufacturing the same, and fluid device of the present invention.

According to the novel pipe joint of the present invention, a hollow layer-form projection is made to communicate with the hole and integrally fixed to the substrate having the hole. The projection is made such that a resin is filled in the hole to form a resin die projected out of the surface of the substrate and a layer-form member is integrally formed on the surface of the substrate and the side surfaces of the resin die, thereafter resin is removed.

According to the novel method for manufacturing a pipe joint of the present invention, the pipe joint is manufactured such that a resin is filled in the hole passed through the substrate and opened at its surface to form a resin die projected out of the surface of the substrate and the layer-form member is integrally formed at the surface of the substrate and the side surface of the resin die, thereafter the resin is removed.

According to the novel fluid device of the present invention, a fluid inlet and a fluid outlet communicating with the external area are arranged at a lid member with respect to a fluid function part closed by an enclosing element comprised of the lid member and a base. At lease one of the fluid inlet and the fluid outlet is formed by a pipe joint which communicates with the hole and in which a hollow layer-form projection is integrally fixed with respect to the substrate having a hole. The pipe joint is made by filling resin in the hole to form a resin die projected out of the surface of the substrate and after integrally forming a layer-form member at the surface of the substrate and the side surfaces of the resin die by a plating process, thereafter removing the resin.

BRIEF DESCRIPTION OF THE DRAWINGS

A more complete appreciation of the present invention and many of the attendant advantage thereof will be readily obtained as the same become better understood by reference to the following detailed description when considered in connection with the accompanying drawings, wherein:

FIG. 7 is a schematic sectional view for showing a configuration of an optical forming die cast making device;

FIG. 11 is a schematic sectional view for showing a configuration of an optical forming device to illustrate a method for making a resin die of a sixth preferred embodiment of the present invention;

FIG. 12 is a schematic sectional view for showing in an order of steps of a method for making a resin die of a seventh preferred embodiment of the present invention;

FIG. 31 is a sectional view for showing in order of manufacturing steps of a micro-reactor of a fifteenth preferred embodiment of the present invention;

DETAILED DESCRIPTION OF THE PREFERRED EMBODIMENTS

Figure 1A:
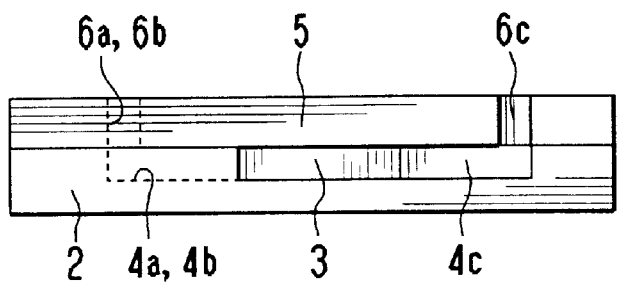
FIG. 1 is a sectional view for showing a manufacturing step of a micro-reactor in its order of a first preferred embodiment of the present invention.
Figure 1B:
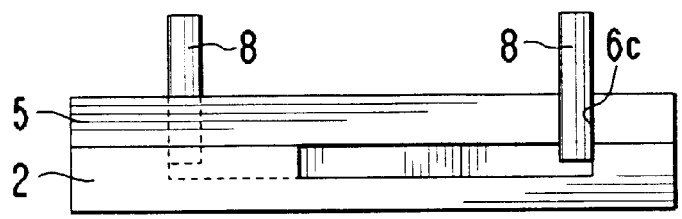
Figure 1C:
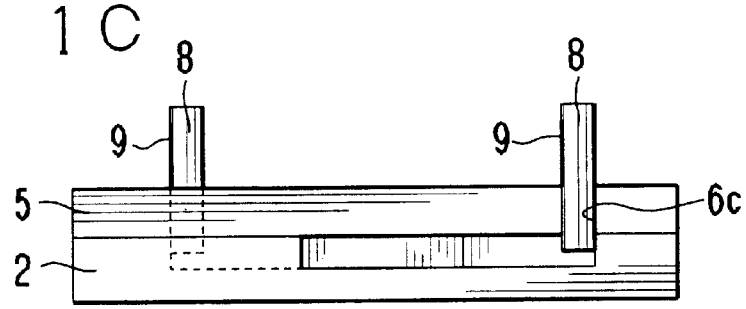
Figure 1D:
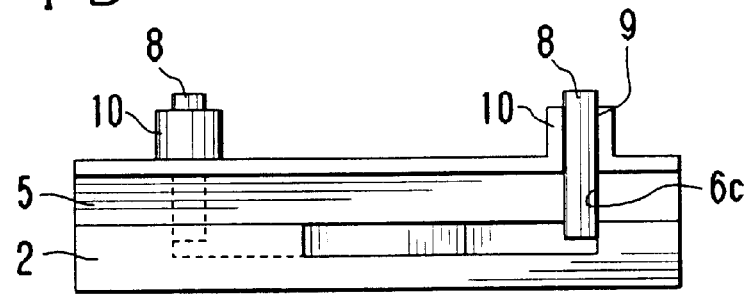
Figure 1E:
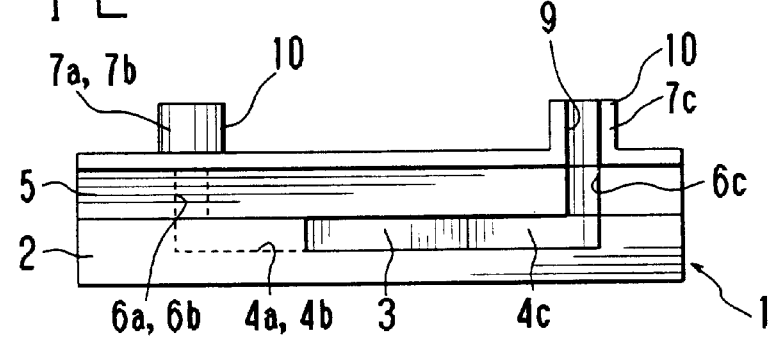
Figure 2A:
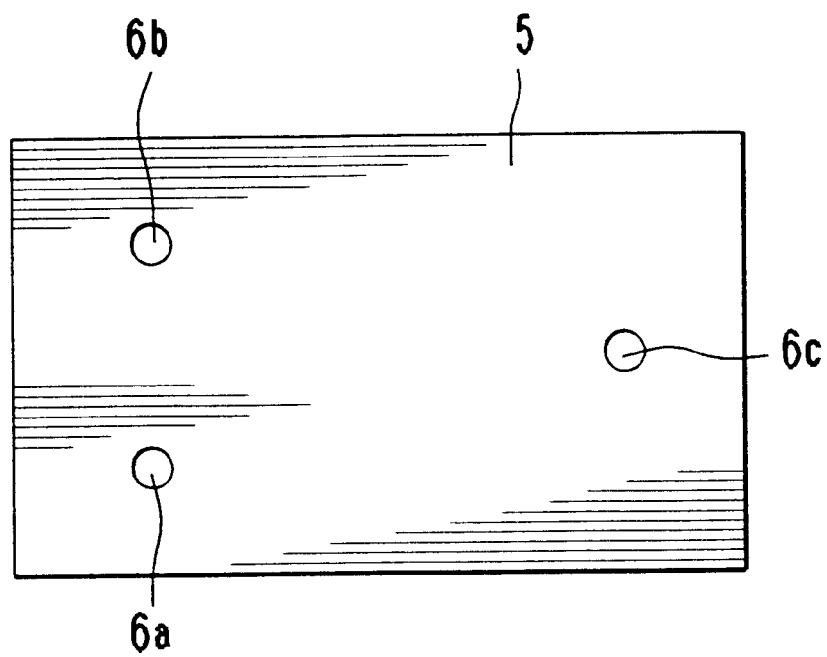
FIG. 2 is a top plan view for showing a lid and a base.
Figure 2B:
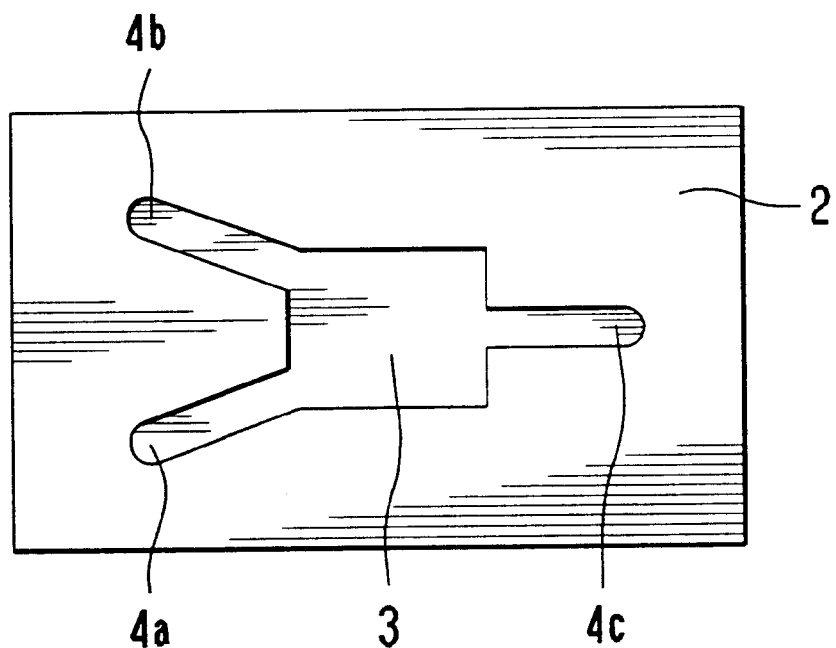
Figure 39A:
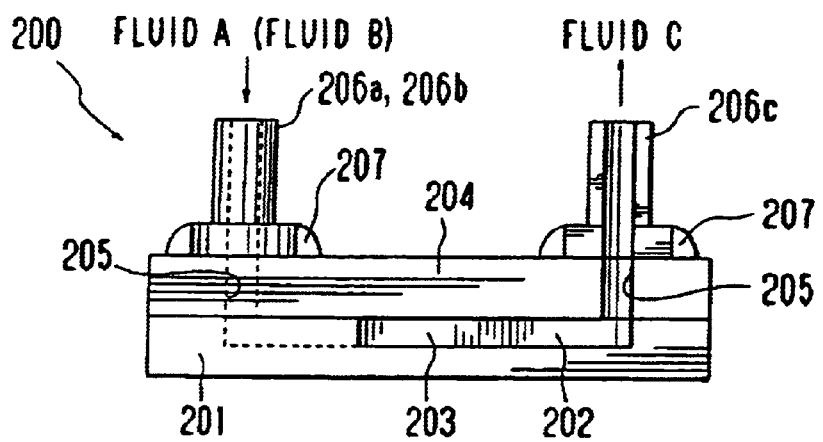
FIG. 39 is a sectional view for showing an example of connected configuration of the prior art micro-reactor.
Figure 40A:
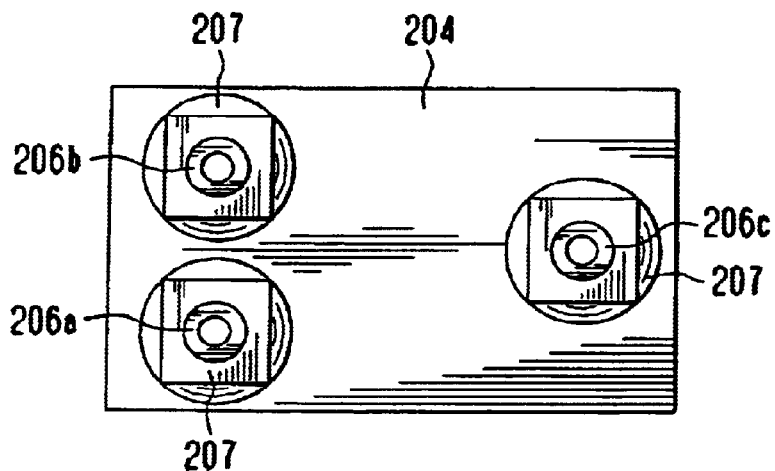
FIG. 40 is a top plan view for showing a lid and a base.
Figure 40B:
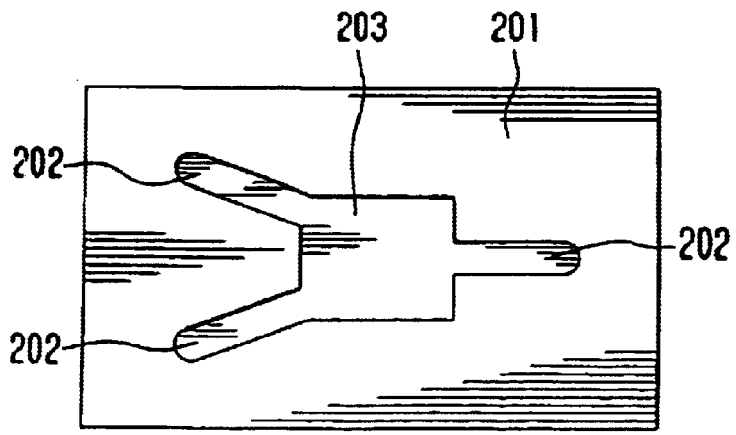

Referring now to FIGS. 1 and 2, a first preferred embodiment of the present invention will be described. This preferred embodiment illustrates an example of application to the micro-reactor having a quite simple structure similar to that shown in FIG. 39 as a fluid device. Reference numeral 2 denotes a base where a reactor 3 and a flow passage 4 (4a, 4b, 4c) which is made to communicate with the reactor 3 are formed into a recess shape, and reference numeral 5 denotes a lid where a hole 6 (6a, 6b, 6c) passed through a front surface and a rear surface and opened at surfaces is formed at a position corresponding to each of the flow passages 4a, 4b and 4c. Hollow metallic projection 7 (7a, 7b, 7c), as hollow layer-form member, are provided so as to communicate with each of the holes 6a, 6b and 6c. These metallic projections 7 (7a, 7b, 7c) are integrally formed by plating work. These metallic projections 7a, 7b and 7c correspond to fluid inlets and fluid outlets in the micro-reactor 1, respectively.

Referring to FIG. 1, the present invention as well as the method for making the micro-reactor 1 described above will be described in more detail. FIG. 1 illustrates a method for directly forming the fluid inlet and the fluid outlet in the micro-reactor 1 at the device surface.

At first, the reactor 3 of the base 2 made of monolithic silicon 100 and the flow passage 4 are formed by anisotropic etching under application of KOH (potassium hydroxide) with a silicon nitride film being applied as a mask. The lid 5 is made of pilex glass (Corning No. 7740) and the hole 6 is formed by a sand blasting process. Such a base 2 and the lid 5 are overlapped while being aligned, a voltage of about several hundred V is applied while they are being heated at about 300° C., and thereby the anodic bonding is performed under no application of adhesive agent, whereby a device segment is manufactured. FIG. 1(a) illustrates the fluid device before forming the fluid inlet and the fluid outlet. In the prior art, after anodic connection, the commercially available joint is adhered to the hole of the lid with adhesive agent to form the inlet and the outlet.

In view of this fact, the preferred embodiment is constructed such that resin dies 8 acting as plating dies as shown in FIG. 1(b) are projected and formed at the hole 6 of the fluid device manufactured by the anodic bonding, and after a sheath layer 9 of electrolysis plating is formed as shown in FIG. 1(c), thereafter the electrolysis plating is grown around the resin dies 8 to form an electrolysis plating layer 10 and the resin dies 8 are melted and removed, thereby the hollow metallic projections (pipe) 7 communicating with the hole 6 of the device, i.e. the inlet and the outlet are formed.

In general, to the inlet and the outlet are connected the tubes, so that in the preferred embodiment, column-like resin dies 8 are used.

A specific feature to be noticed herein consists in burying the resin dies 8 in the holes 6 of the fluid device. With such an arrangement as above, adhesiveness of the formed resin dies 8 is remarkably improved (in particular, this is remarkable in the case of a fine diameter) and its yield in a subsequent step becomes quite superior. In the example shown in FIG. 1, although the diameter of the resin die 8 and the diameter of the hole 6 are shown in the same manner to each other, there occurs no problem at all even if the resin die 8 having a larger diameter than that of the hole 6 is formed. However, a pipe outer shape of each of the inlet and the outlet becomes large, a larger tube is required, or a pipe inner diameter of each of the inlet and the outlet becomes larger than the diameter of the hole of the device, the fluid flows (is the case of the inlet) from the larger flow passage to the narrow flow passage, whereby a fluid resistance is slightly increased. In view of the characteristics of the inlet and the outlet, adhesiveness of the resin die 8, a diameter and a height of the resin die 8 as well as a depth of the hole 6, it is necessary to determine the most suitable diameter of the resin die. In order to improve adhesiveness of the resin die 8 more, a primer processing is also effective.

As a method for manufacturing the resin die 8, the present inventors studied a dispensing system and an optical forming system. Also in the dispensing system, it is possible to form the resin die. At present, however, the optical forming system is the most suitable one, and the preferred embodiment of the present invention makes it by the optical forming system because the dispensing system has poor productivities such as a large convex or concave side wall of the resin die, a poor reproducibility of the diameter of the resin die, a quite hard manufacturing of the resin die with a fine diameter, a poor vertical characteristic with respect to the forming surface of the resin die or necessity of manufacturing the resin die separately for respective hole. The method for manufacturing the resin die by the optical forming system will be described later in reference to the subsequent preferred embodiments.

Hereinafter, a method for forming the metallic projections 7a, 7b and 7c as the layer-form member on the lid 5 and the resin die 8 is described. The present embodiment introduces the method for forming the metallic projections 7a, 7b and 7c by plating work.

As a method for forming a sheath layer 9 for an electrolysis plating with respect to the column-like die 8, there are provided a method for forming a conductive metallic film by a sputtering process or a method for forming a Ni film by a non-electrolysis plating. In the preferred embodiment of the present invention, a Ni layer is formed to have about 2 to 3 $\mu$m by a non-electrolysis Ni plating. A non-electrolysis Ni plating step is carried out after performing a degreasing step, a conditioning step and an activating step.

Although not illustrated in the processing step of FIG. 1, if whole of formed resin die 8 was formed with the Ni film, the hole was closed, so that after performing the activating step, resist was applied the extremity end of the resin die 8 (the extremity end of the resin die 8 was immersed in a horizontal container filled with resist at a specified depth), and after performing a processing in which no Ni film was formed at the extremity end (forming the non-plated forming part), the non-electrolysis Ni plating was carried out. Further, the non-electrolysis Ni plating was formed at the sidewalls and the rear surface of the device, so that the resist was similarly coated on or the protection tape was adhered to the sidewalls and the rear surface. Such all the processings on the specified portion where adhesion of the plating is not desired will be eliminated in each of the subsequent preferred embodiments for a sake of simplification of description (accordingly, if otherwise specified in particular, a similar process will be applied).

As to the pre-processing step for the non-electrolysis Ni plating process, it is necessary to study the most-suitable pre-processing step in reference to the material of the lid 5 of the device forming the non-electrolysis plating and the resin material of the resin die 8. In the case of material having a superior degree of flatness such as glass, quartz and the like, the non-electrolysis Ni plating film shows poor adhesiveness, so that it is desired to perform a processing for making a rough surface to attain an effect of anchor. Further, in the case that the adhesiveness cannot be improved, it becomes necessary to perform a processing in which the sheath layer 9 of the non-electrolysis Ni plating (in particular, the hollow metallic projection forming substrate surface) is formed by a thin film such as a sputtering film. That is, this process is performed under a combination of both a sputtering process for the sheath layer 9 for the electrolysis plating at the device surface and a non-electrolysis plating process for the sheath layer 9 at a circumference of the resin die 8. In any event, for a sake of simplification of description in the preferred embodiment, forming of the sheath layer 9 for the electrolysis plating will be described in reference to its non-electrolysis Ni plating.

After forming the sheath layer 9 after performing the non-electrolysis Ni plating, an annealing process (at a temperature less than a heat-resistant temperature of resin) is performed to improve adhesiveness of the non-electrolysis Ni film (the sheath layer 9), thereafter the electrolysis Ni plating is carried out. As the electrolysis Ni plating, a film thickness is several hundred $\mu$m. Thus, this becomes a so-called hollow metallic projection 7, i.e. a wall thickness of the pipe, it is necessary to determine the most-suitable thickness in reference to a diameter, height and required strength or the like of the projection. As to material quality of a plating film (metallic projection 7), i.e. pipe, Cu, Ni—W alloy or the like other than Ni can be applied. It is of course apparent that not only a single plating but also plating of a plurality of layers is possible.

Lastly, the resin die 8 is resolved with solvent and removed to complete the inlet and outlet by the metallic projection (pipe) 7.

There occurs sometimes in the fluid device that the pipe forming material (the plating material in the preferred embodiment) is not suitable for the fluid used in the fluid device (reacted with liquid). In such a case as above, it is also possible to form a non-active film such as gold (Au) by plating process at the inner wall of the pipe which is in contact with at least the fluid.

The first embodiment of the present invention introduces the method for forming the metallic projections 7 as the layer-form member on the lid 5 and the resin die 8 integrally by plating work. As other embodiments for forming the layer-form member, it is possible to form the layer-form member using a layer-form member formed out of silicon dioxide or silicon nitride by CVD (chemical vapor deposition) generally used in method for fabricating semiconductor device. It is also possible to form the layer-form member using a layer-form member formed out of Al or Au by sputtering.

Figure 3A:
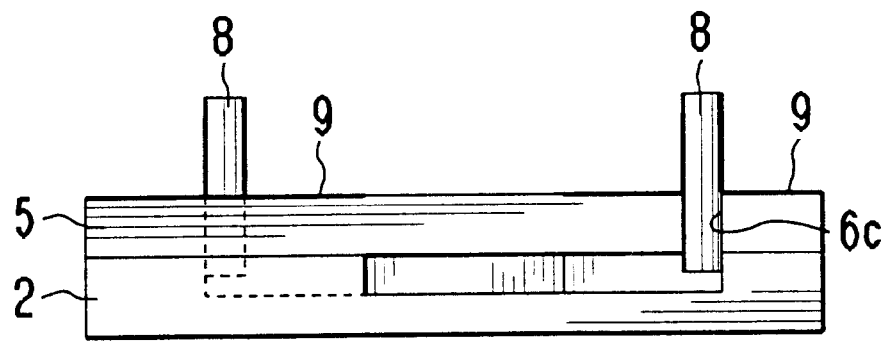
FIG. 3 is a sectional view for showing a manufacturing step of a micro-reactor in its order of a second preferred embodiment of the present invention.
Figure 3B:
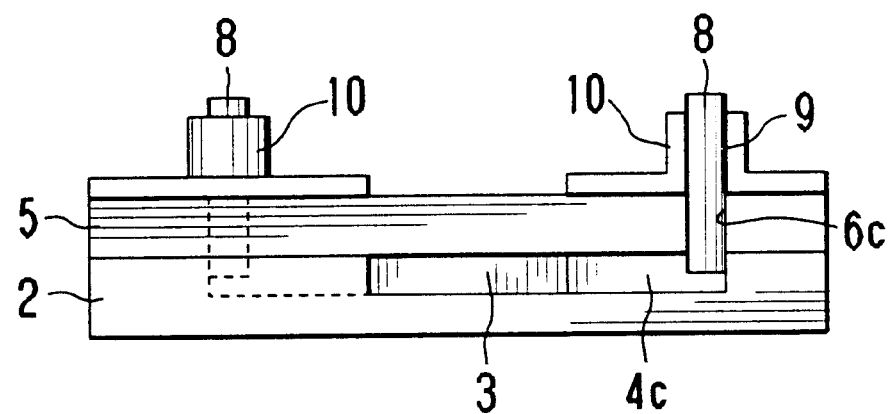
Figure 3C:
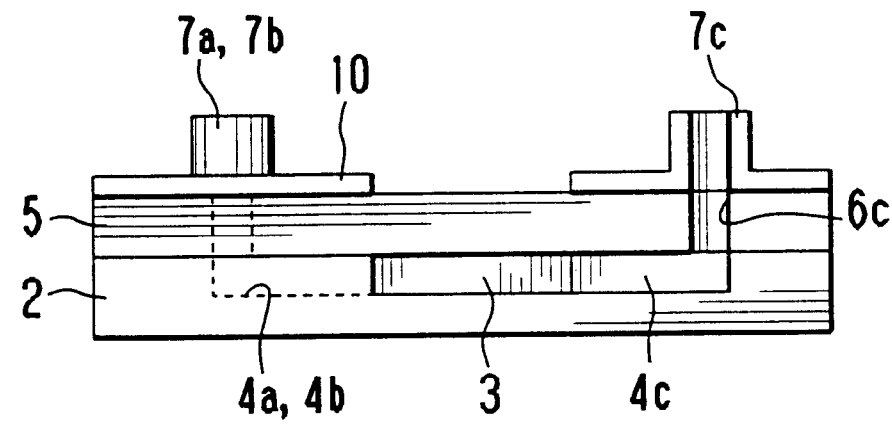

Referring to FIG. 3, a second preferred embodiment of the present invention will be described. The same portions as those shown in the first preferred embodiment are denoted by the same reference numerals and their description will be eliminated (similarly applied to each of the subsequent preferred embodiments).

In general, it is desired in the fluid device such as a micro-reactor that accumulation of air bubbles, situation of reaction and state of dispersion or the like in the device can be confirmed. Also in the case of micro-reactor 1 in the first preferred embodiment, it is necessary to visually observe the inside part of the reactor 3 (occasionally, by an optical analysis method), so that a transparent glass is applied as the lid 5. However, in the first preferred embodiment, the entire forming surface of the inlet and the outlet by the metallic projection (pipe) 7 in the lid 5 is plated as the sheath layer 9 and the electrolysis plating layer 10, resulting in that the inside part of the reactor 3 cannot be observed. In addition, in the case where the pipe wall thickness of the formed metallic projection (pipe) 7 is increased, there occurs a possibility that the device is warped by stress of the plating film (the electrolysis plating layer 10).

In view of this fact, in the preferred embodiment, the plating films such as the sheath layer 9 and the electrolysis plating layer 10 are formed to minimum. As apparent from FIG. 3, the forming region of the sheath layer 9 (the non-electrolysis Ni plating forming region) is restricted, whereby the electrolysis plating layer 10 is not formed at the surface of the lid 5 at the upper part of the reactor 3. Accordingly, the surface is kept transparent and a visual observation from outside becomes possible.

Although no details are shown in the process chart of FIG. 3, after performing the activating process, the resist is coated on the non-plating forming part or the protection tape is adhered, thereafter the non-electrolysis Ni film forming process is carried out. As already described in the first preferred embodiment, the side walls and the rear surface of the device (the micro-reactor 1) were similarly processed. As a result, warp of the device (the micro-reactor 1) caused by the plating Ni film (the sheath layer 9 and the electrolysis plating layer 10) is remarkably reduced.

Figure 4A:
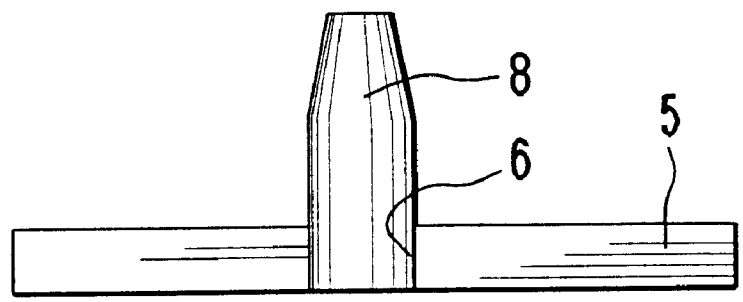
FIG. 4 is a sectional view for showing a manufacturing step in its order of a metallic projection of a tapered shape of a third preferred embodiment of the present invention.
Figure 4B:
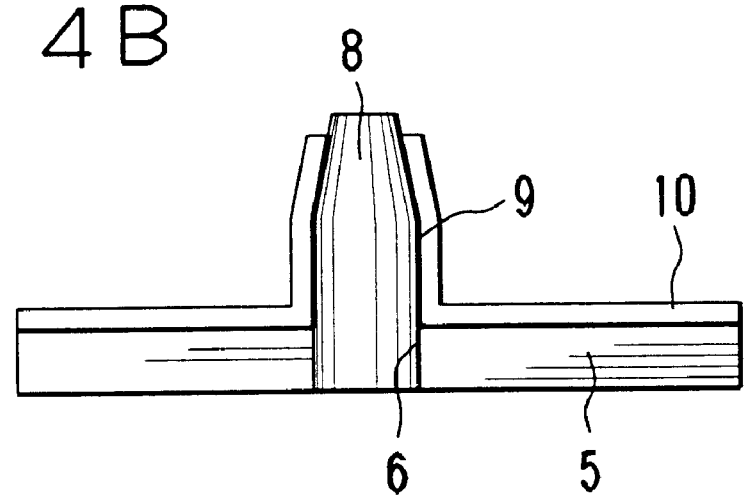
Figure 4C:
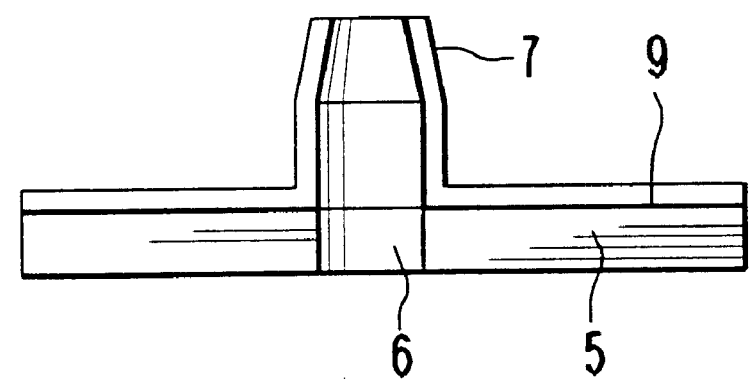

Referring now to FIG. 4, a third preferred embodiment of the present invention will be described. This preferred embodiment is made such that the extremity end of the plating resin die 8 is formed to be narrowed at its tip end (a tapered shape) (FIG. 4(a)) to cause the electrolysis plating layer 10 to be formed in compliance with the resin die 8 (FIG. 4(b)) and the inlet and outlet formed by the metallic projection (pipe) 7 are formed such that their extremity ends may become a narrow end shape (tapered shape)(FIG. 4(c)).

Although the tapered shape can be realized by the dispenser process, in the preferred embodiment, the optical forming process is employed to be described later. In the case of the optical forming process, optical hardened resin layers are stacked up in multiple layers to make the resin die 8 of column-like structure, wherein at this time, this making process is performed under a state in which the exposure time at each of the layers is changed (the thick portion is applied with over-exposure and the exposure time is shortened to cause the tapered extremity end to be less-exposed). Application of such a resin die 8 causes the shape of the hollow metallic projection 7 formed by the electrolysis plating layer 10 to become a narrow end shape, so that the tube is easily inserted into the metallic projection 7.

Figure 5A:
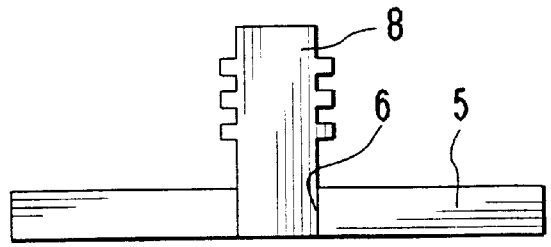
FIG. 5 is a sectional view for showing a manufacturing step of a metallic projection with a shape of concave or convex of a fourth preferred embodiment of the present invention.
Figure 5B:
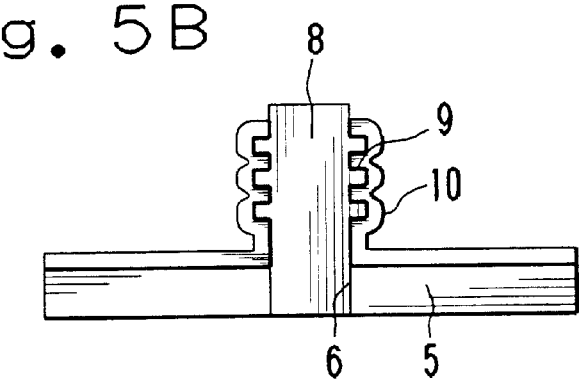
Figure 5C:
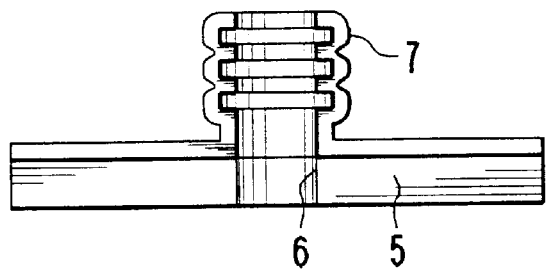

Referring to FIG. 5, a fourth preferred embodiment of the present invention will be described. In this preferred embodiment, the outer circumferential surface of the plating resin die 8 is formed into a protrusion/recess shape in the opening direction of the hole 6 (FIG. 5(a)), the electrolysis plating layer 10 is also formed in compliance with the resin die 8 (FIG. 5(b)), whereby the inlet and outlet by the metallic projection (pipe) 7 themselves are formed into a protrusion/recess shape in the hole direction of the hole 6 (FIG. 5(c)).

Such a resin die 8 of protrusion/recess shape is made, like the third preferred embodiment, such that the exposure time at each of the layers is changed in the optical forming process (an amount of exposure per unit volume is made different and if the thickness of the layer is kept same, the exposure time at the portion having a large diameter is extended). Application of such a resin die 8 and forming the hollow metallic projection (pipe) 7 with the electrolysis plating layer 10 cause the protrusion/recess shape (practically, this is not an acute protrusion/recess shape as shown in the figure) to become more smooth, resulting in that the surface may become a curved surface-like protrusion/recess one. (Accordingly, FIG. 5 shows an exaggerated form of the protrusion/recess shape.) With such an arrangement as above, in the case that the tube is inserted into the metallic projection (pipe) 7, an adhesive force between the tube and the pipe is improved as compared with that of the flat pipe and leakage of fluid can be prevented more completely.

Figure 6:
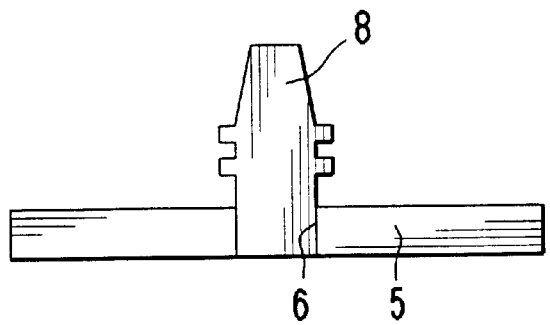
FIG. 6 is a sectional view for showing a resin die of a modified example.

As a shape of the resin die 8, the tapered shape plus the protrusion/recess shape having these third and fourth preferred embodiments combined to each other, as shown in FIG. 6, can be applied and the shape may be formed into another appropriate shape.

Referring to FIGS. 7 to 10, a fifth preferred embodiment of the present invention will be described. This preferred embodiment relates to an optical forming process (an optical forming die casting device) for forming the resin die described above. As the optical forming process, there have been provided a method in which a laser light source is used as a light source and the laser light is scanned; a method in which a forming base plate is moved while the UV light from the UV light source is being focused by lenses; or a method in which only a specified portion is exposed with the substantial parallel UV light under application of the mask. In any event, as already described in the first preferred embodiment above, the optical forming process causes the size of the protrusion/recess shape of the side walls of the resin die to become quite small, reproducibility of the diameter of the resin die as well as its vertical characteristic to be improved. In addition, application of the mask aligned with each of the holes enables a plurality of resin dies to be formed at once and its productivity can be quite increased.

Summary of the optical forming device 11 of the preferred embodiment will be described in brief. The substrate 13 (or the device) having the hole 12 opened to communicate with the front surface and the rear surface is set to a holder 15 connected to a Z stage 14. Ultra-violet (UV) curing resin 16 is filled in a container 18 mounted on the device base 17, and the substrate 13 set at the holder 25 sinks into the UV curing resin 16 liquid in a stepwise manner by the Z-stage 14 at optional depth (the resin thickness to be set by once exposure). As light for curing the resin 16, UV light 20 fed from a high pressure mercury lamp 19 acting as a UV light source used in a general photo-lithography stage is utilized and this is selectively applied under a control of the shutter 21. This UV light 20 passes only through the resin die forming part, i.e. around the hole 12 by the glass mask 22 aligned with the hole 12 and only the resin 16 around the hole 12 on the substrate 13 is selectively exposed. Thus, only the resin around the hole 12 is set to form the resin die 23.

As the UV curing resin 16 in the preferred embodiment, the resin which can be cured through radiation of the UV light 20 was used. In accordance with one example of experiment using the same, it was possible to form the resin die 23 having $\phi 400$ $\mu$m, height of 6000 $\mu$m and an aspect ratio of 15. It was of course apparent that it was possible to form the resin die 23 having a height of 10 mm with a more diameter such as $\phi 0.9$ mm or more, for example.

In the case that only the hole 12 having a certain size is formed at the substrate, the substrate 13 is sunk into the resin 15, whereby the resin 16 immerses into the hole 12, so that it is also possible to optically cur the resin 16 inside the hole 12. On the contrary, in the case of the completed fluid device or in the case of the substrate 13 having a small hole 12, pushing of the resin 16 into the hole 12 is quite difficult to perform. In this case, it requires an operation for dripping the resin 16 into the hole 12 at the surface of the substrate 13 (or the device) or sinking the substrate 13 and returning it to a predetermined position, thereafter pushing the resin 16 into the hole 12 by a squeezing action with respect to the substrate 13 having resin 13 adhered thereto. As to whether or not the resin 16 is easily immersed into the hole 12, this is influenced by a viscosity of the resin 16, a diameter of the hole 12 and wettability of the resin die forming surface (the surface of the substrate 13) or the sidewall of the hole 12. In addition, as to what position (depth) in the hole 12 the resin 16 is to be cured, it can be adjusted in reference to the radiation time of the UV light 20. In order to keep a high adhering strength, a deeper resin depth is desirable.

Figure 8A:
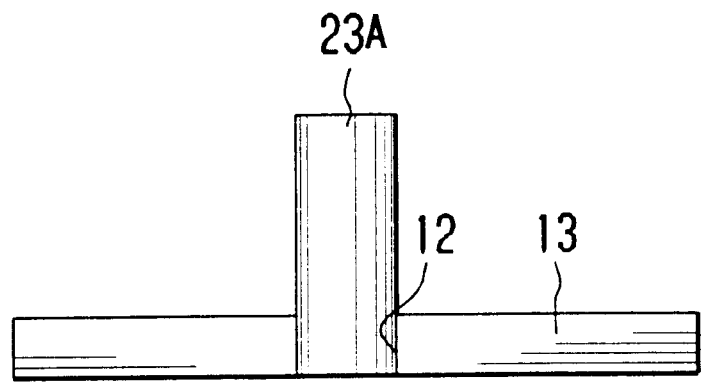
FIG. 8 is a sectional view for showing a making step in order by an optical forming process.
Figure 8B:
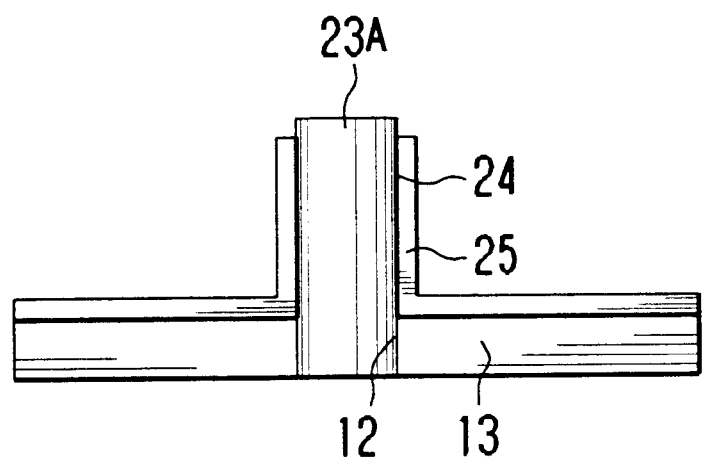
Figure 8C:
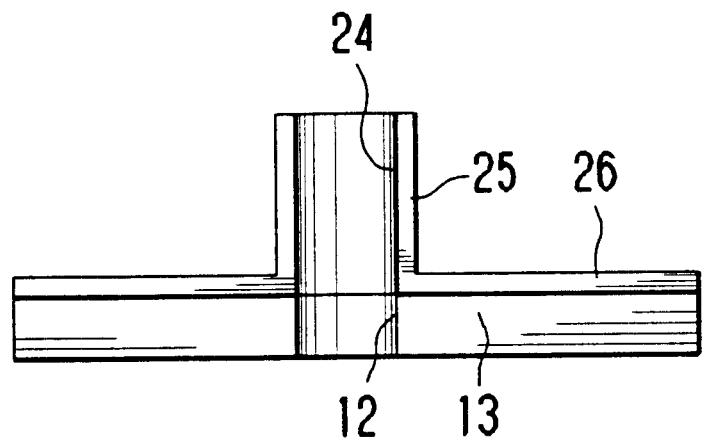
Figure 9A:
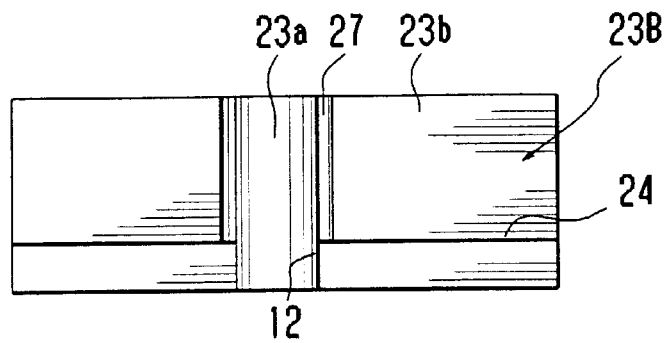
FIG. 9 is a sectional view for showing a making step in order by an optical forming process with a donut-shaped structure.
Figure 9B:
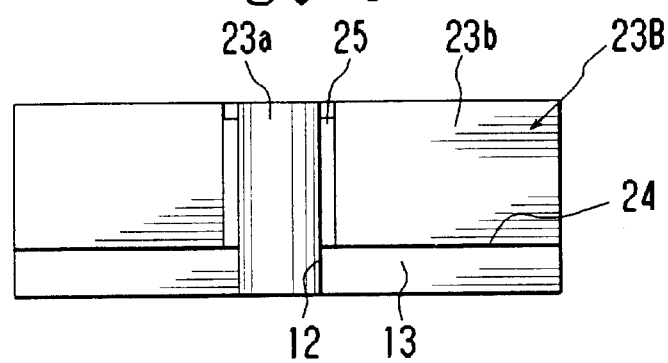
Figure 9C:
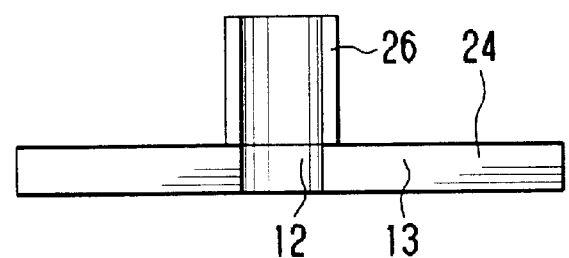
Figure 10:
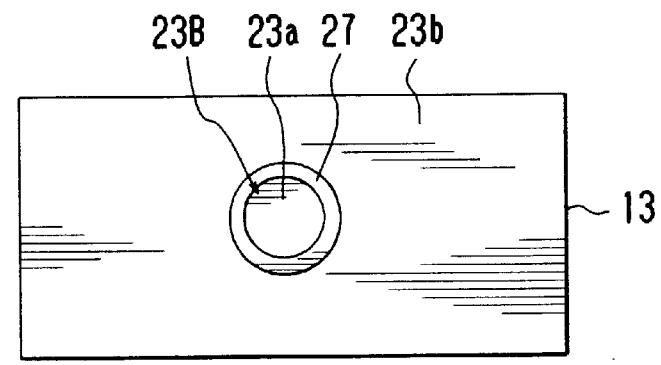
FIG. 10 is a top plan view for showing a donut-shaped structure.

FIGS. 8 to 10 illustrate the main resin die 23 capable of being manufactured by such an optical forming process above and the plating stage for the resin die 23.

In these figures, FIG. 8 illustrates an example of a column-like resin die 23A described above which can be manufactured by a dispensing process, and FIGS. 9 and 10 illustrate a donut-shaped resin die 23B which can be formed by the optical forming process. The donut-shaped resin die 23B shown in FIGS. 9 and 10 is comprised of a central column-like resin 23a and a resin 23b outside the column-like resin. Reference numeral 24 denotes a sheath layer acting as an electrode for plating operation and reference numeral 25 denotes an electrolysis plating layer and it becomes a hollow metallic projection 26.

In the case of the resin die 23A having the column-like structure shown in FIG. 8, although plating (the sheath layer 24, the electrolysis plating layer 25) is formed around the resin of column-like structure, the hollow metallic projection (pipe) 26 is manufactured (also on the surface of the substrate 13), in the case of the resin die 23B of donut-structure, plating (the electrolysis plating layer 25) is formed (buried) in the clearance 27 between the outer resin 23b and the central resin 23a as shown in FIG. 9 to make the hollow metallic projection (pipe) 26.

The above embodiments of the present invention introduces the method for forming the metallic projections 7 as the layer-form member on the lid 5 and the resin die 8 integrally by plating work. As other embodiments for forming the layer-form member, it is possible to form the layer-form member using a layer-form member formed out of silicon dioxide or silicon nitride by CVD (chemical vapor deposition) generally used in method for fabricating semiconductor device. It is also possible to form the layer-form member using a layer-form member formed out of Al or Au by sputtering.

In the case of the resin die 23B of donut-structure, the location where the plating (the metallic projection 26) is connected is of only the thickness of the clearance, i.e. the wall thickness portion of the formed pipe (the metallic projection 26), so that if the clearance (the wall thickness of the pipe) is large, no problems occur. On the contrary, if the clearance is small, there occurs sometimes a problem in adhesive strength of the pipe (the metallic projection 26). Further, since the clearance is filled with the plating (the electrolysis plating layer 25), the small clearance may cause a trouble in circulation of the plating liquid and a uniform pipe is hardly attained. However, since the sheath layer 24 for the electrolysis plating (the electrode for electrolysis plating) is formed in advance before forming the resin die 23B, so that there occurs also an advantage that the pipe (the metallic projection 26) can be formed only by the electrolysis plating. However, as to what resin dies 23A, 22B are to be selected, it is desirable to select them in reference to a strength of the pipe required (the metallic projection 26) or the like. As to the shape of the resin die, only the column-like shape is illustrated, although occasionally, a triangle, a rectangular square and an elliptical shape or the like may also be applicable. As to the portion where adhered plating is not desired, the process similar to that described above will be performed.

Referring to FIG. 11, a sixth preferred embodiment of the present invention will be described. The preferred embodiment relates to a method for manufacturing the resin die where the adhesiveness is remarkably improved. As described above, when the resin die is formed at the hole and the hollow metallic projection (pipe) is formed by plating operation, a quite important feature consists in adhesiveness of the resin die. After forming the resin die, not-yet-cured resin is cleaned, and degreasing, conditioning and activating steps are present before the non-electrolysis plating step, wherein super-sonic wave is applied and various kinds of solvent are used and there are many elements for peeling off the resin dies. It is of course apparent that the steps are different, but they are similar in the case of the resin die of the donut-structure as shown in FIGS. 9 and 10.

The preferred embodiment illustrates an example of application in which the substrate 31 such as a glass having a light permeability against an optical wave length required for curing the resin is used. The substrate 31 for forming the resin die has a hole 32 opened toward the front surface and the rear surface. Reference numeral 33 denotes a container capable of storing the not-yet-cured UV curing resin liquid 34 and immersing the substrate 31 in the liquid.

In the case that the substrate 31 having an optical transparency is used, the UV light 36 passed through the opening 35a of the mask 35 may also pass through the substrate 31 and the light is also radiated to the rear surface of the substrate 31. Then, at the initial stage to start the optical formation, for example, as shown in FIG. 11, the substrate 31 to form the resin die 37 is sunk into the UV curing resin liquid 34 only by a proper depth so as to cure at first the resin present at the rear surface of the substrate 31 and the resin present in the hole 32. After this operation, the substrate 31 is relatively sunk in sequence in a stepwise manner and the curing resins are stacked up. At this time, it is desired that the cured resin region (the opening 35a of the mask 35) is set to be larger than the diameter of the hole 32 of the substrate 31 as shown in the figure.

With such an arrangement as above, the formed resin die 37 has a convex sectional shape to cause the rear surface of the substrate 31, side walls of the hole 32 of the substrate 31 and the surface of the substrate 31 to be connected to the resin die, whereby adhesive strength of the resin die 37 is remarkably improved. In the case that a curing depth of the UV curing resin liquid 34 is high (when the permeability of the UV light 36 is high), there occurs no problem even if the exposure is performed under a state in which the substrate 31 is completely sunk into the UV curing resin liquid 34.

Referring to FIG. 12, a seventh preferred embodiment of the present invention will be described. Basically, similar to the sixth preferred embodiment, this preferred embodiment relates to a method for manufacturing the resin die for remarkably improving the adhesiveness and illustrates an example of application to the case in which the substrate 41 such as silicon having no permeability is used.

The substrate 41 to form the resin die has a hole 42 opened to the frontward or rearward direction. In the case of the substrate 41 having no optical permeability, it is not possible to permeate light which cures the resin, so that light can not be radiated from the front surface of the substrate (the resin die forming surface side) as found in the case shown in FIG. 11. In view of this fact, the rear surface of the substrate 41 is immersed in the liquid surface of the UV curing resin liquid, thereby as shown in FIG. 12(a), the not-yet-cured resin 43 is adhered to the rear surface of the substrate 41 and pulled up from the resin liquid surface. At this time a part of the resin 43 enters into the hole 42. Then, as shown in FIG. 12(b), the UV light 44 is radiated from the adhered surface with respect to the substrate 4 to which resin is adhered, whereby the resin 43 is cured. With such an arrangement as above, the resin 43 becomes the curing resin 45 as shown in FIG. 12(c).

Then, the substrate 41 having the curing resin 45 having the resin at the rear surface and in the hole 42 cured is placed in the optical forming device as shown in FIG. 7, and the resins 45 are stacked up in sequence to be projected in a column-like manner at the front surface of the substrate 41, thereby the resin die 46 is manufactured. In the example illustrated herein, although the resin 45 is not adhered to the surface of the substrate 41, there occurs no problem at all even if the resin 45 is adhered to the surface of the substrate 41.

The resin die 46 is formed in this way, the adhesive strength of the resin die 46 is remarkably improved in the same manner as that of the sixth preferred embodiment.

It is of course apparent that the method for manufacturing the resin die indicated in the preferred embodiment can also be applied to the case that the aforesaid permeable substrate 31 is applied. However, in this case, the resin is adhered only to the rear surface of the substrate 31 and in the hole 32, the UV light 36 is radiated from either the rear surface or the front surface of it. In addition, in the case of the fluid device such as the micro-reactor and the like described above, resin is poured in advance into the inner structure communicating with the hole in the flow passage around the hole, and if the lid is of optical permeable one, the UV light is radiated against the surface to cure the resin in the flow passage near the hole in advance. In the case that the lid has no optical permeability, it is satisfactory that time required for radiating UV to the hole is kept quite long, the exposure region is expanded under utilization of reflection of light at the inner structure so as to expand the UV curing region.

Figure 13:
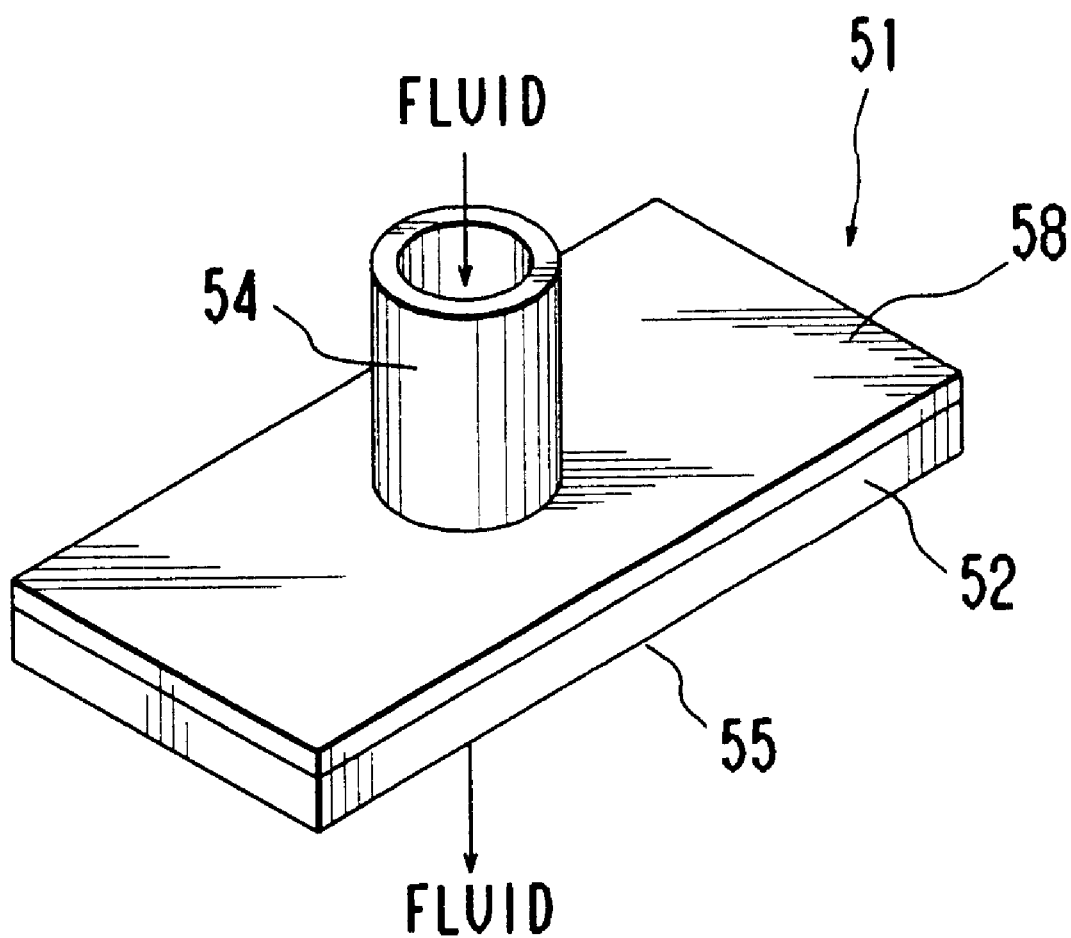
FIG. 13 is a schematic perspective view for showing an example of configuration of a micro-fluid joint of an eighth preferred embodiment of the present invention.

Referring to FIGS. 13 and 14, an eighth preferred embodiment of the present invention will be described. The preferred embodiment shows an example of application in which as one example of the fluid device, it is applied to the micro fluid joint 51. After the hole 53 opened in the forward and rearward directions is formed at a inorganic substrate, for example, glass (also including $SiO_2$, quartz) or monolithic silicon, the hollow metallic projection (pipe) 54 is formed by the aforesaid process. The surface other than the pipe-forming surface, the rear surface in FIG. 13 is applied as a connecting surface 55 with other parts so as to generate a so-called fluid joint.

However, it is a substantial feature that the connecting surface 55 is formed by glass (also including $SiO_3$, quartz) or silicon. This means that it is satisfactory that the surface having the glass sputtered to the monolithic silicon substrate or thermal oxidized $SiO_2$ may be applied. If the connecting surface 55 is glass (also including $SiO_3$, quartz) or silicon, there occurs no problem at all even if the material of the substrate 52 is different from that of the connecting surface 55. As already described in the prior art, the fluid device manufactured by the MEMS process is mainly comprised of silicon, glass (also including $SiO_2$ and quartz) and a reason why a connecting adaptability with such a device as above (adhesive-less), for example, connection with fluoric acid, anodic bonding and a direct bonding or the like are applied as important features consists in a necessity that the connecting surface 55 is of silicon and glass (also including $SiO_2$, quartz). Since various kinds of connections require a heating operation, material quality of the pipe manufactured by the plating operation, i.e. composition of the plating film is required to be selected in reference to the heating temperature required for the connecting operation. It is of course apparent that the substrate where the pipe is formed also has a heat-resistant characteristic and the connecting operation with the aforesaid adhesive-less requires a quite flat surface, whereby, as the material for the substrate 52, it is required to apply inorganic material. Study and development in the field of MEMS have been promoted and adhesive agent which is quite thin and can be patterned such as a si-top (amorphous fluorocarbon polymer such as Teflon) different from the conventional adhesive agent, for example, have been provided as proposals. However, the item to be adhered by this adhesive agent is glass (also including $SiO_2$, quartz) or silicon. That is, the connecting surface 55 at the joint is of glass (also including $SiO_2$, quartz) or silicon, it can be applied to various kinds of MEMS devices.

FIG. 14 is a sectional view for showing the manufacturing steps for such a micro-fluid joint 51 as described above. At first, inorganic material substrate, for example, the substrate 52 of glass (also including quartz) or monolithic silicon is prepared (FIG. 14(a)) and a hole is opened by either etching or sand blasting to form a hole 53 (FIG. 14(b)). Then, as shown in FIG. 14(c), the resin die 56 made of UV curing resin is formed at the hole 53 in a column-like structure and the sheath layer 57 for a plating electrode also including the resin die 56 as shown in FIG. 14(d) is formed at the front surface of the substrate 52. After this operation, as shown in FIG. 14(e), the electrolysis plating layer 58 is formed at the surface of the sheath layer 57 by the electrolysis plating step as shown in FIG. 14(e) and the resin die 56 is removed as shown in FIG. 14(f), whereby the hollow metallic projection (pipe) 54 formed by the electrolysis plating layer 58 becomes an integral-formed joint.

The above embodiments of the present invention introduces the method for forming the metallic projections 7 as the layer-form member on the lid 5 and the resin die 8 integrally by plating work. As other embodiments for forming the layer-form member, it is possible to form the layer-form member using a layer-form member formed out of silicon dioxide or silicon nitride by CVD (chemical vapor deposition) generally used in method for fabricating semiconductor device. It is also possible to form the layer-form member using a layer-form member formed out of Al or Au by sputtering.

In addition, as the method for manufacturing the micro-fluid joint 51, as shown in FIG. 15, the donut-structure as described above in reference to FIG. 9 may be utilized.

FIG. 15 is a sectional view for showing the manufacturing steps for the micro-fluid joint 51 as described above. At first, the inorganic material substrate 52 made of such as glass (also including quartz) or monolithic silicon, for example, is prepared (FIG. 15(a)), the hole 53 is formed by an etching or sand blasting process (FIG. 15(b)). Then, the sheath layer 57 for the plating electrode is formed on the surface of the substrate 52, and the resin die 59 made of UV curing resin is formed in a donut-shaped structure on the hole 53 and the sheath layer 57 as shown in FIG. 15(d). After this operation, as shown in FIG. 15(e), the electrolysis plating layer 58 is formed at the front surface of the sheath layer 57 by the electrolysis plating step, the resin die 59 is removed as shown in FIG. 15(f) to form the joint where the hollow metallic projection (pipe) 54 is integrally formed by the electrolysis plating layer 58.

Figure 14F:
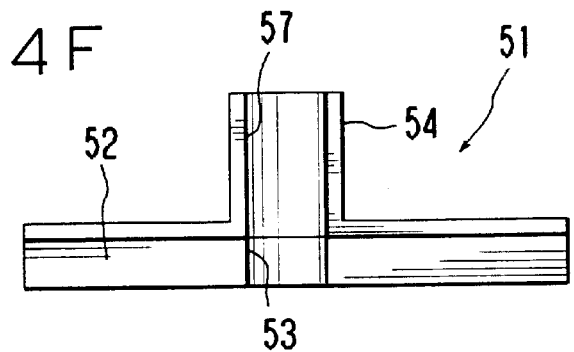
Figure 15A:
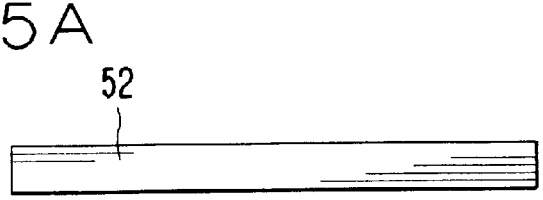
FIG. 15 is a sectional view for showing in order the manufacturing steps under utilization of a donut-shaped structure.
Figure 15B:
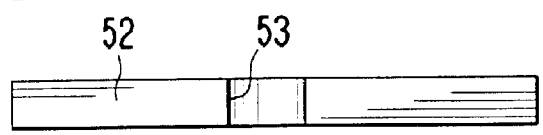
Figure 15C:
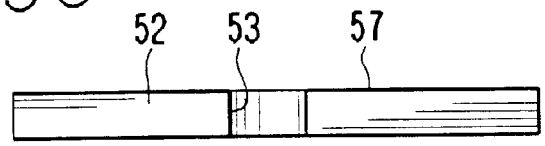
Figure 15D:
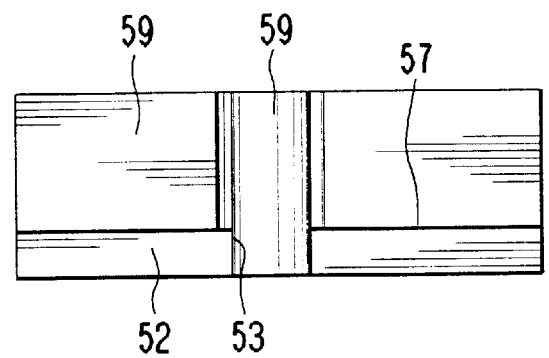
Figure 15E:
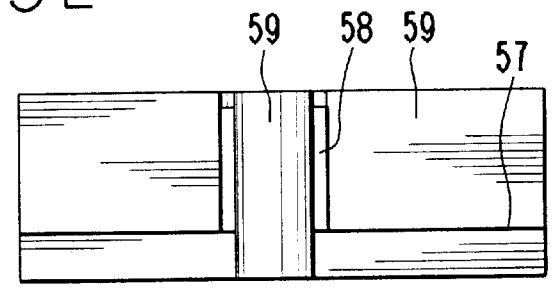
Figure 15F:
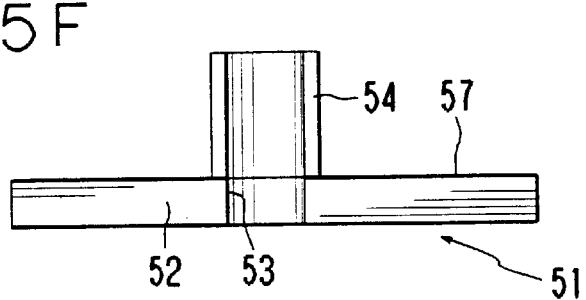
Figure 16A:
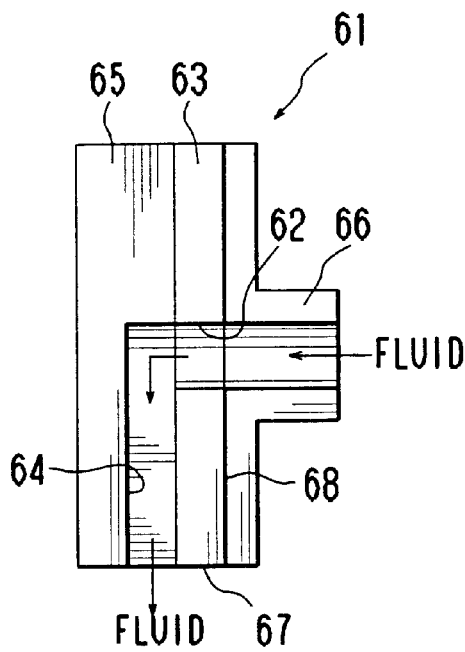
FIG. 16 is a sectional view for illustrating an example of configuration of a micro-fluid joint of a ninth preferred embodiment of the present invention.
Figure 16B:
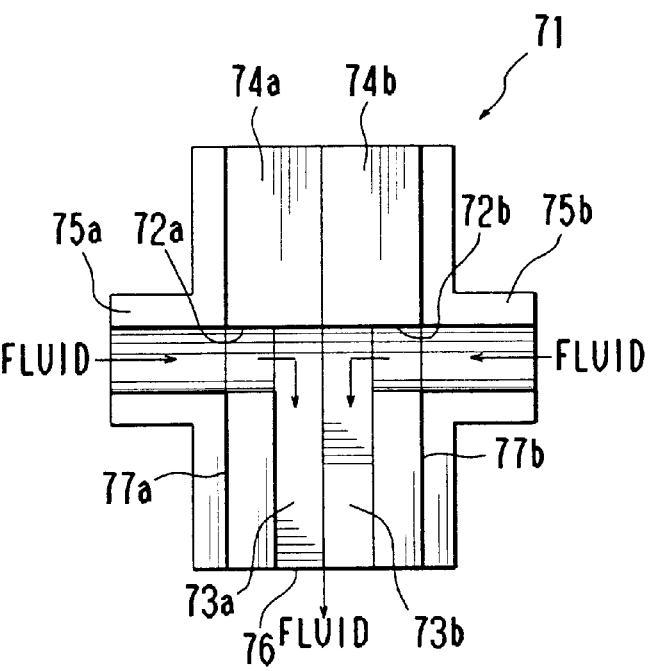
Figure 16C:
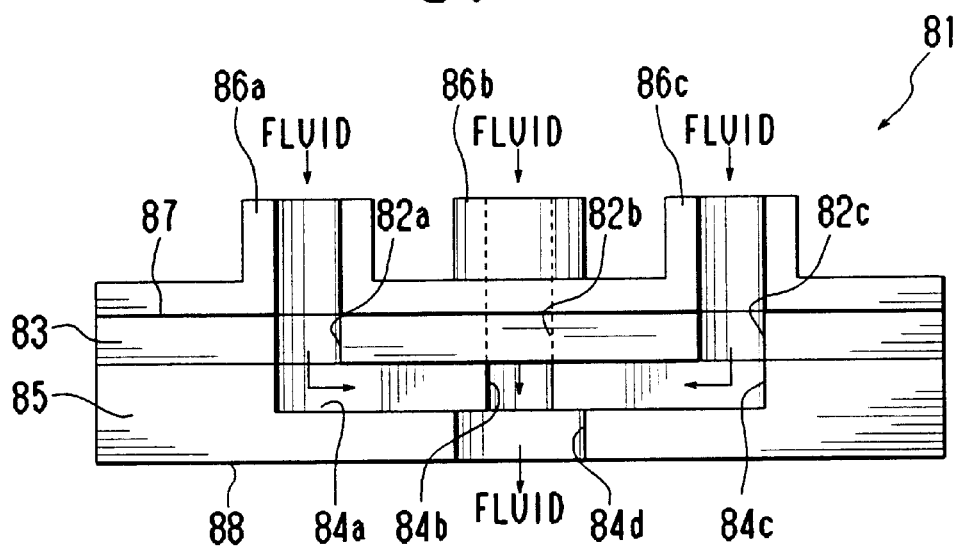
Figure 17:
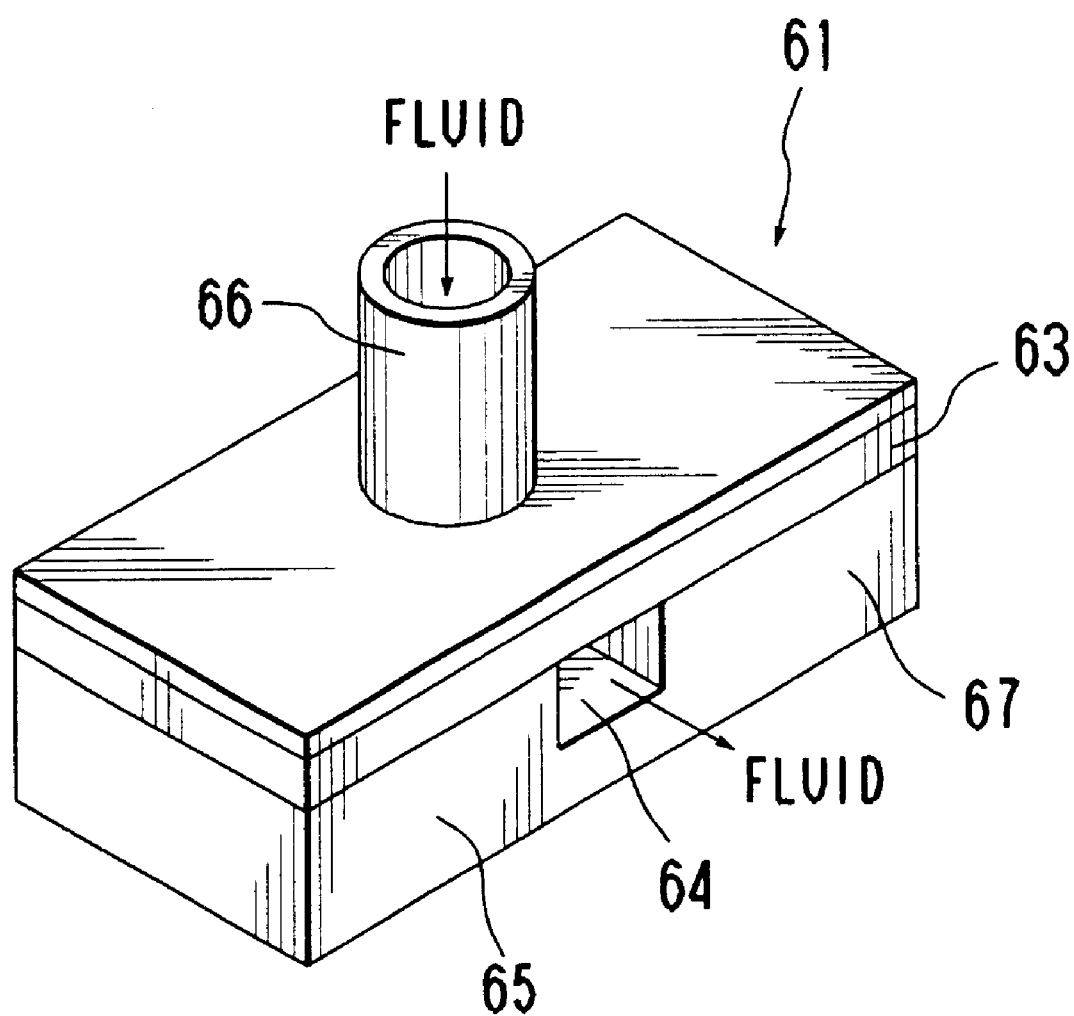
FIG. 17 is a schematic perspective view for showing an L-shaped fluid joint.
Figure 18:
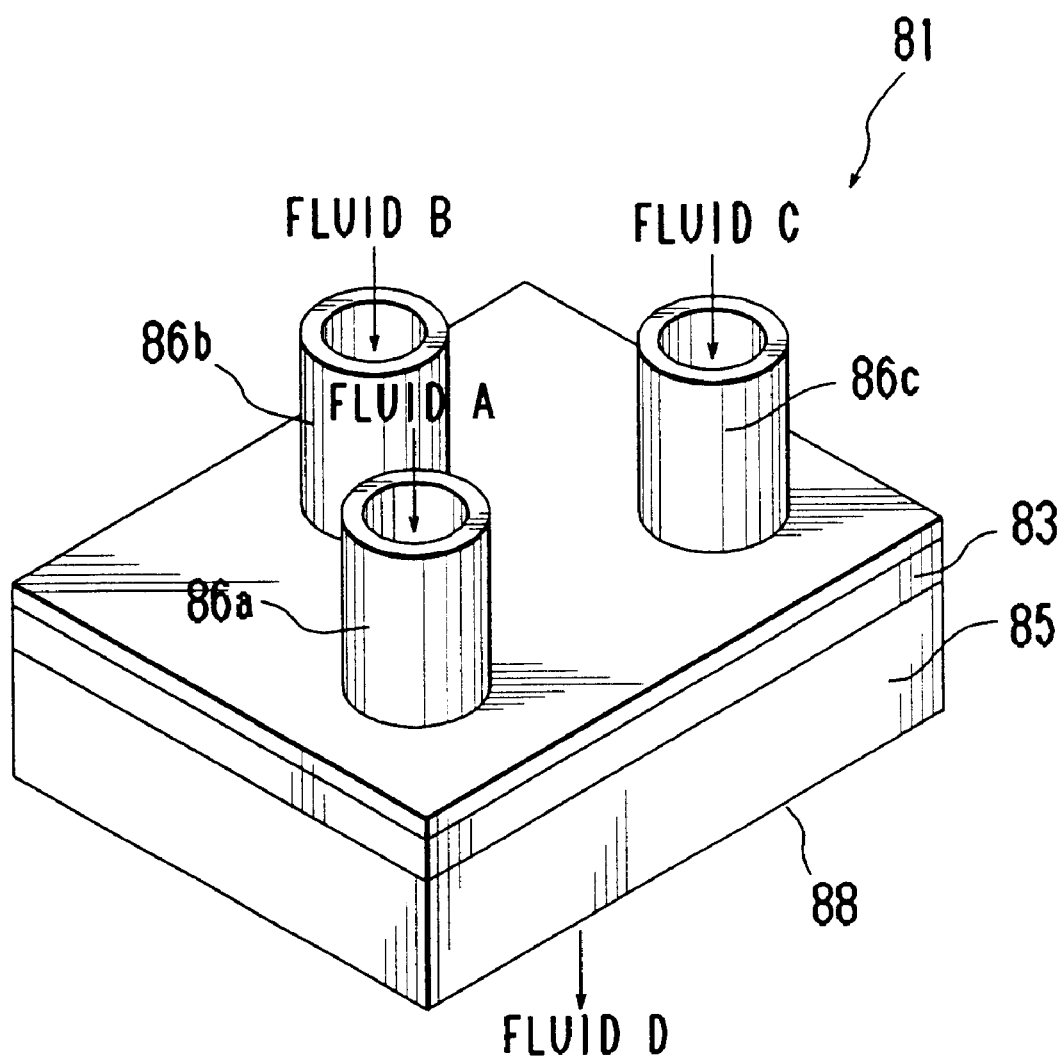
FIG. 18 is a schematic perspective view for showing a multiple type fluid joint.

Referring now to FIGS. 16 to 18, a ninth preferred embodiment of the present invention will be described. This preferred embodiment illustrates an example of configuration of the joint other than the micro-fluid joint 51 having a structure in which the metallic projection 54 (pipe) is set vertically at the hole 53 of the substrate 52 of a so-called single plate as shown in FIG. 14(f) or FIG. 15(f). That is, if the state having no hollow metallic projection (pipe) formed by the plating process is assumed as a kind of fluid device, the hollow metallic projection (pipe) formed by the plating process can be formed under application of the manufacturing method described in reference to the first preferred embodiment.

FIGS. 16(a) and 17 illustrate an example of the L33 shaped fluid joint 61, wherein the substrate 63 having the hole 62 and the substrate 65 formed with a groove 64 corresponding to the flow passage are connected to each other to form a laminated structure substrate, thereafter the metallic projection 66 (pipe) is formed at the hole 62, and the end surfaces where the substrates 63, 65 are laminated are applied as the connecting surface 67. Reference numeral 68 denotes a sheath layer for the plating electrode.

The connecting surfaces 67 are of course polished to attain a connection with other component parts. Since the connecting surfaces 67 are the end surfaces of the two substrates 63, 65, when silicon, glass (also including quartz) and the like are not formed at the connecting surfaces 67, but the substrates 63, 65 are applied as the connecting surfaces 67, it is necessary that the same material is used for the substrates 63, 65. That is, it is required to provide the laminated structure of glass (also including quartz)/glass (also including quartz) or the laminated structure of silicon/silicon. The fluid flows from the metallic projection 66 to the connecting surfaces 67 in a horizontal direction as indicated by an arrow, thereafter the fluid changes its direction perpendicular to the connecting surfaces 67, flows in or flows out of it.

FIG. 16(b) illustrates an example of a T-shaped fluid joint 71, wherein the substrates 74a, 74b formed with each of the holes 72a, 72b and the flow passages (grooves) 73a, 73b communicating with the holes 72a, 72b are connected to each other in such a way that the flow passages (grooves) 73a, 73b are adapted, thereafter the metallic projections 75a, 75b (pipes) are formed at the holes 72a, 72b of both substrates 74a, 74b. Reference numeral 76 denotes a connecting surface. This connecting surface 76 is similar to that of the L-shaped joint 61 and it is necessary that the substrates 74a, 74b are the same substrates as each other. Reference numerals 77a, 77b denote sheath layers for the plating electrode.

FIGS. 16(c) and 18 illustrate an example of a multiple fluid joint 81, wherein the substrate 83 having a plurality of, for example, three holes 82a, 82b and 82c and a substrate 85 formed with flow passages (grooves) 84a, 84b and 84c and a hole 84d are connected to each other, the metallic projections (pipes) 86a, 86b, 86c are integrally formed with each of the holes 82a, 82b, 82c of one substrate 83. Reference numeral 87 denotes a sheath layer for a plating electrode and reference numeral 88 denotes a connecting surface.

As shown in FIG. 18, fluids A, B and C enter the connecting surface 88 through the three metallic projections (pipes) 86a, 86b, 86c, thereafter they are curved by the flow passages 8a, 84b, 84c and merged to each other and they get into/get out of one hole 84d at the connecting surface 88 as fluid D.

In this case, since the connecting surface 88 becomes one substrate 85, as to the substrates 83, 85, it may also be applicable that the different kinds of substrates, i.e. a laminated structure of glass (also including quartz)/silicon can be attained. In this case, a reason why, as the inorganic material substrate, the laminated substrate of glass (also including quartz) or monolithic silicon is used consists in the fact that various kinds of fine machining technology and connecting technology in the field of MEMS can be utilized and quite fine holes, grooves (corresponding to the flow passage) or the like can be formed.

Figure 19A:
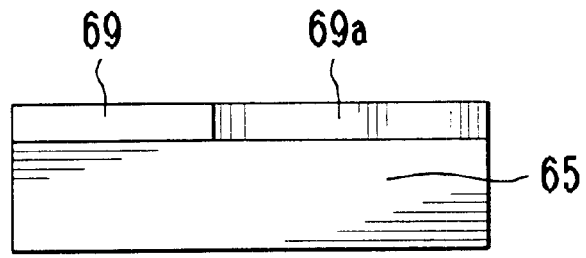
FIG. 19 is a sectional view for illustrating manufacturing steps for an L-shaped fluid joint of a tenth preferred embodiment of the present invention.
Figure 19B:
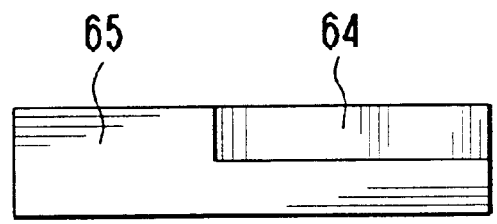
Figure 19C:
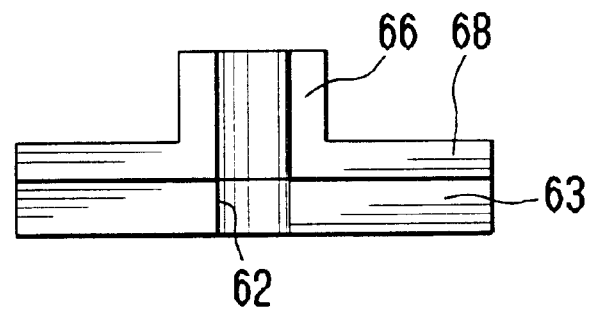
Figure 19D:
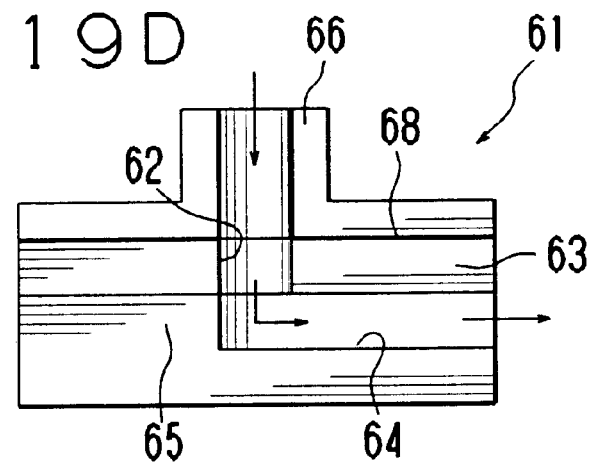
Figure 20A:
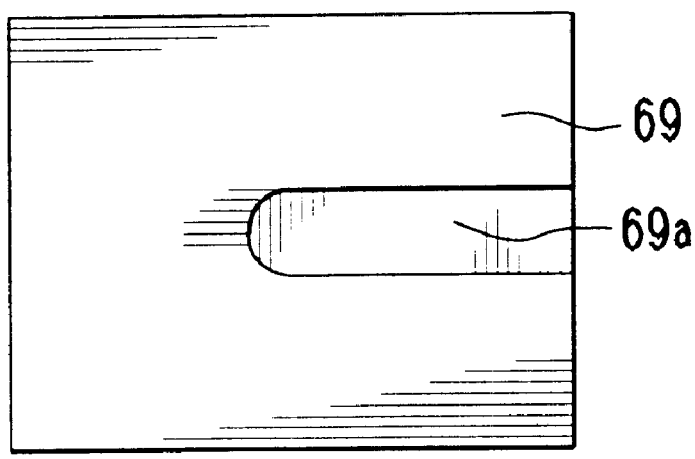
FIG. 20 is a top plan view for showing a shape of a mask and a shape of a substrate.
Figure 20B:
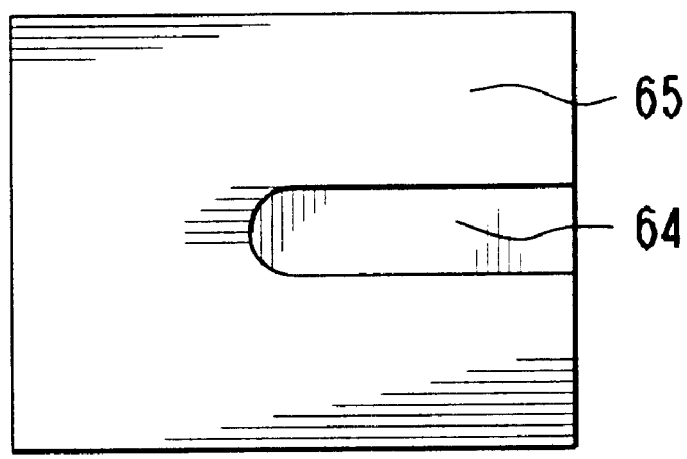

Referring to FIGS. 19 and 20, a tenth preferred embodiment of the present invention will be described. This preferred embodiment relates to a method for manufacturing the L-shaped fluid joint 61 described above. At first, as shown in FIG. 19(a), a flow passage etching mask 69 is formed on the surface of one glass substrate 65 with resist, the substrate 65 is etched under application of the mask 69 for flow passage etching to etch the flow passage etching, thereafter as shown in FIG. 19(b), the resist of the passage etching mask 69 is removed to form the groove 64 corresponding to the flow passage of which shape is approximately U-shape. Accordingly, the substrate 65 with which a flow passage is formed is attained. FIG. 20(a) illustrates a shape as seen in a top plan view of the flow passage etching mask 69 where the desired etching pattern 69a is formed. In this case, in the preferred embodiment, since the flow passage (groove 64) of the L-type fluid joint 61 is required to have the same degree as that of the diameter of the hole 62 of the other substrate 63, the groove 64 is machined by a sand blasting process.

In turn, the substrate 63 formed with the metallic projection 66 (pipe) is prepared (FIG. 19(c)) separate from the substrate 65 formed with such a flow passage as above under application of the resin die forming stage, the hollow metallic projection (pipe) forming stage by plating and a resin die removing stage. Then, the substrate 65 as shown in FIG. 19(b) and the substrate 63 as shown in FIG. 19(c) are aligned to each other and connected by fluoric acid bonding under adhesive-less situation and the connected surface 67 is polished to complete the L-type fluid joint 61.

Figure 21A:
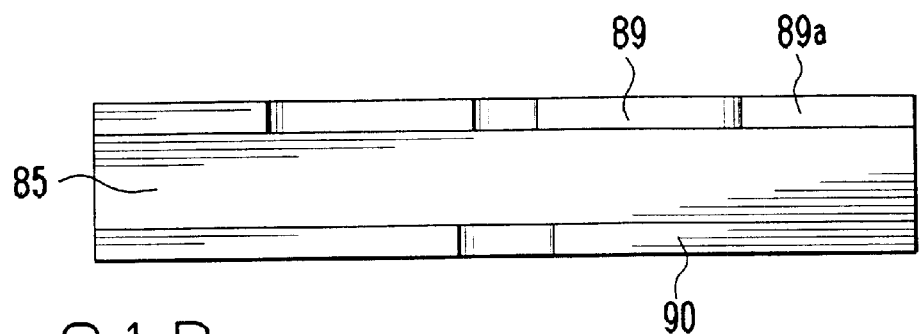
FIG. 21 is a sectional view for illustrating manufacturing steps of a multiple type fluid joint of an eleventh preferred embodiment of the present invention.
Figure 21B:
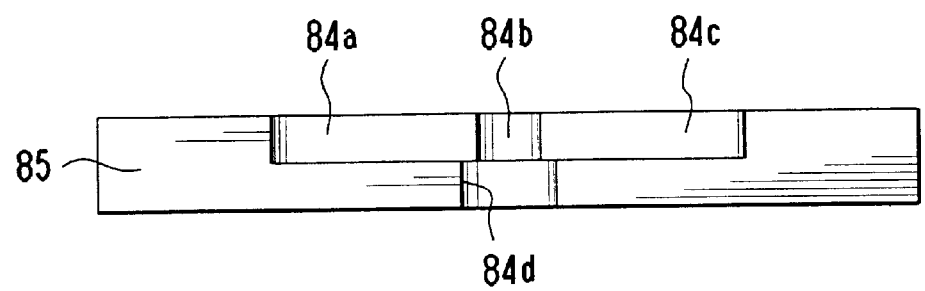
Figure 21C:
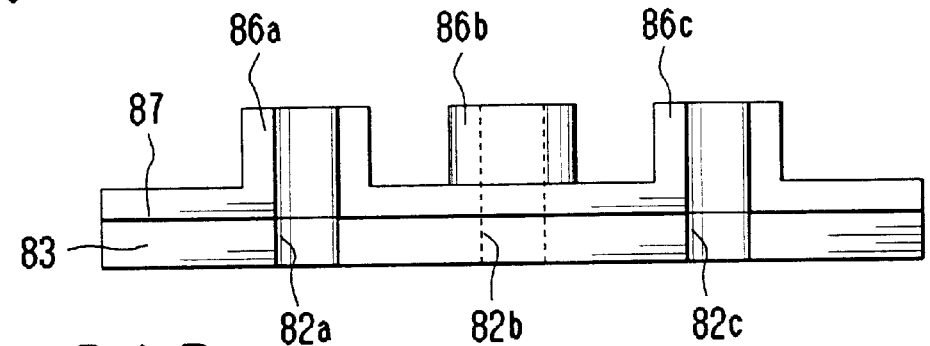
Figure 21D:
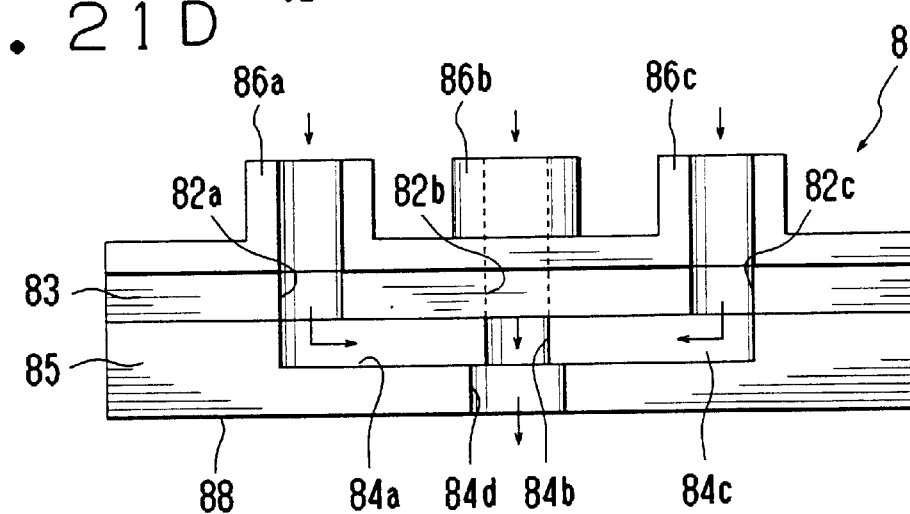
Figure 22A:
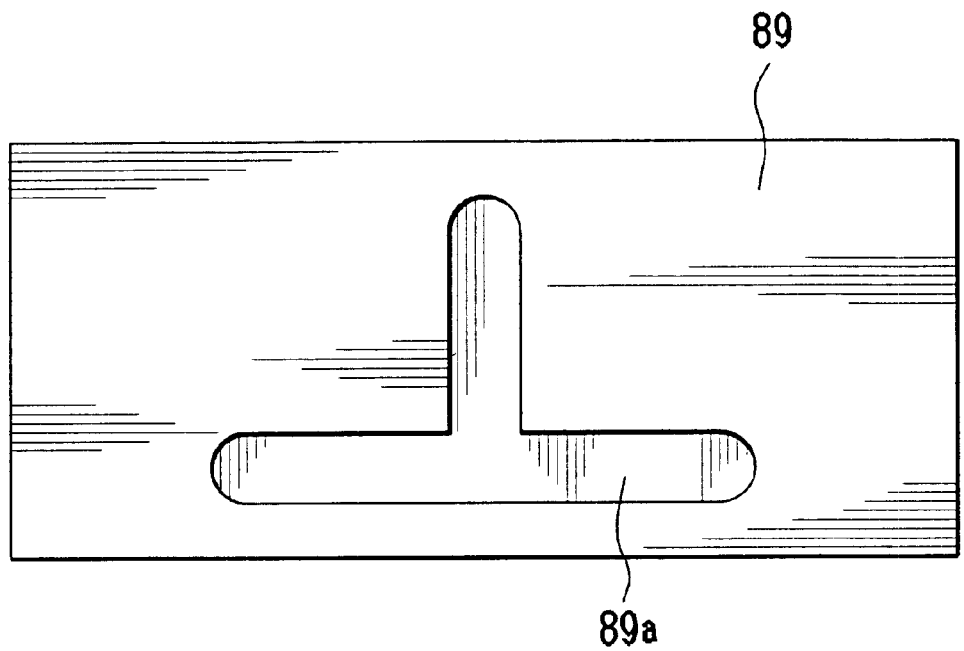
FIG. 22 is a top plan view for showing a shape of a mask and a shape of a substrate.
Figure 22B:
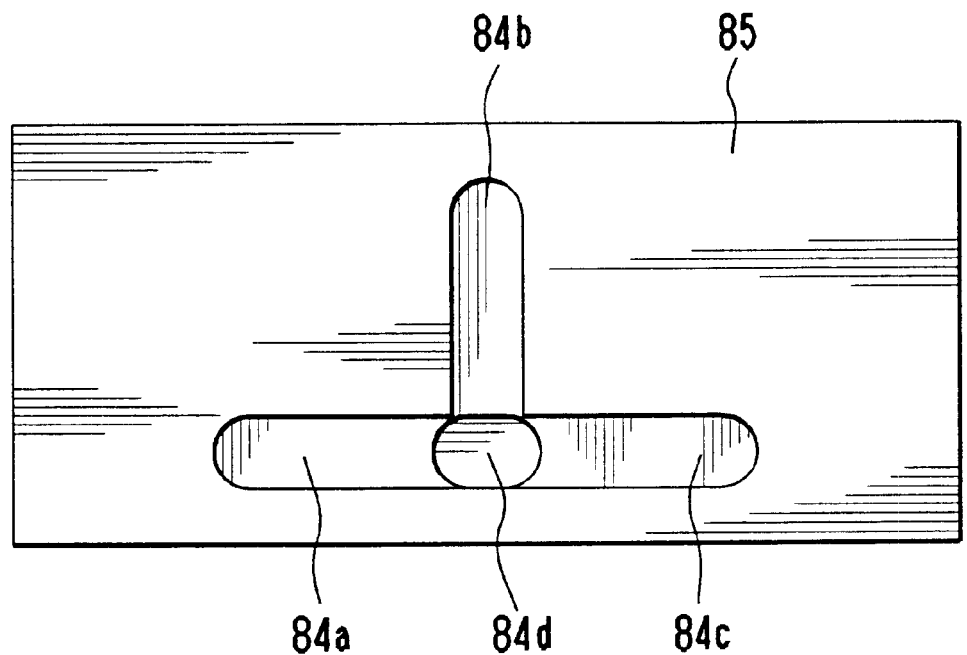

Referring to FIGS. 21 and 22, an eleventh preferred embodiment of the present invention will be described. This preferred embodiment relates to a method for manufacturing the multiple fluid joint 81 described above. At first, as shown in FIG. 21(a), holes and the flow passage etching masks 89, 90 are formed at both surfaces of one silicon substrate 85 under application of resist, the substrate 85 is etching processed by a sand blasting process under application of these etching masks 89, 90, thereafter the resists of the etching masks 89, 90 are removed as shown in FIG. 21(b) to form the flow passages 84a, 84b, 84c and the hole 84d, respectively. With such an arrangement as above, the substrate 85 formed with the flow passages and the holes can be attained. FIG. 22(a) illustrates a shape of the etching mask 89 formed with a predetermined etching pattern 89a as seen in its top plan view, and FIG. 22(b) illustrates a shape of the substrate 35 as seen in its top plan view formed with the flow passages 84a, 84b, 84c and the hole 84d under application of etching process.

In turn, separate from the substrate 85 formed with the holes and the flow passages as described above, the glass substrate 83 formed with the metallic projections 86a, 86b, 86c (pipes) under application of the resin die forming stage, the hollow metallic projection (pipe) stage by plating, and the resin die removing stage as described above is prepared (FIG. 21(c)). Then, the substrate 85 shown in FIG. 21(b) and the substrate 83 shown in FIG. 21(c) are aligned to each other and connected by an anodic bonding under an adhesive-less state to complete the multiple-fluid joint 81.

Although in the micro fluid joint manufacturing method in the previous preferred embodiment, it has been described that the substrates formed with grooves corresponding to the holes and flow passages required for the joint are connected to each other, thereafter the plating resin die is manufactured, the tenth and eleventh preferred embodiments provide a method for manufacturing the micro fluid joint by a method wherein one substrate having the resin die formed at the hole and the hollow metallic projection (pipe) formed by plating and the other substrate formed with the flow passages (grooves) or the like are connected to each other. Forming the plating resin die under a so-called device state having the hole and the flow passage formed (the state where the flow passage is assembled) therein shows a problem that the curing resin removing stage becomes quite hard to perform due to difficulty of filling of resin liquid into the hole, filling of the resin also into the flow passage or fine structure or curing of the resin in the flow passage or the like. In view of this fact, in these preferred embodiments, at first the hollow metallic projection is formed, thereafter it is connected to the other substrate (assembled with it). Accordingly, filling of the resin into the flow passage is not performed and the resin cleaning stage becomes quite easy. In addition, since it becomes possible to form sufficiently the resin die at the rear surface of the substrate, it becomes possible to improve adhesive strength of the plating resin die and forming of the pipe, i.e. a yield of the micro-fluid joint can be quite increased.

Figure 23A:
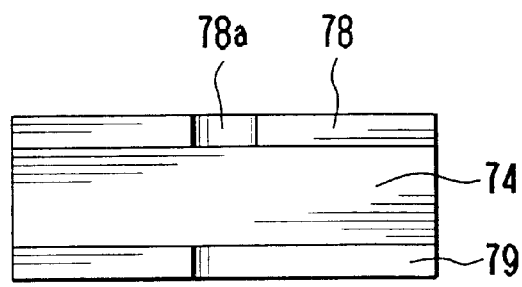
FIG. 23 is a sectional view for illustrating manufacturing steps of a T-type fluid joint of a twelfth preferred embodiment of the present invention.
Figure 23B:
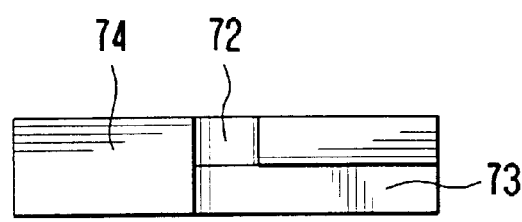
Figure 23C:
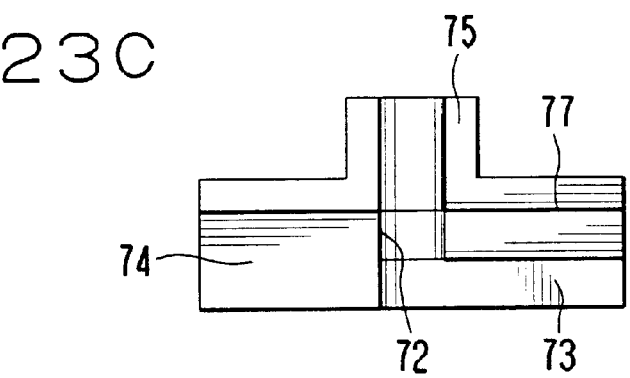
Figure 23D:
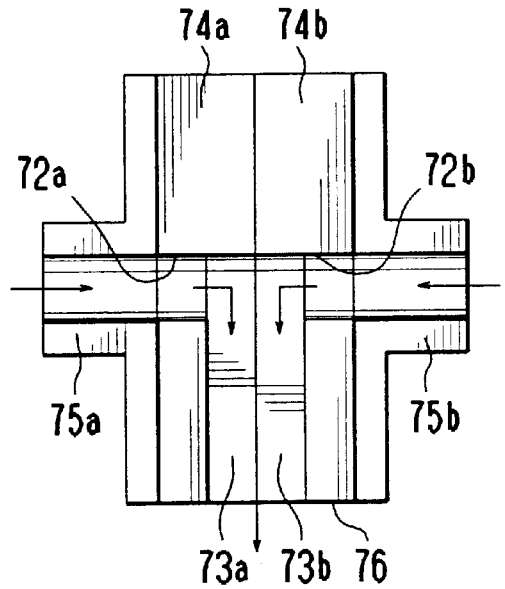
Figure 24A:
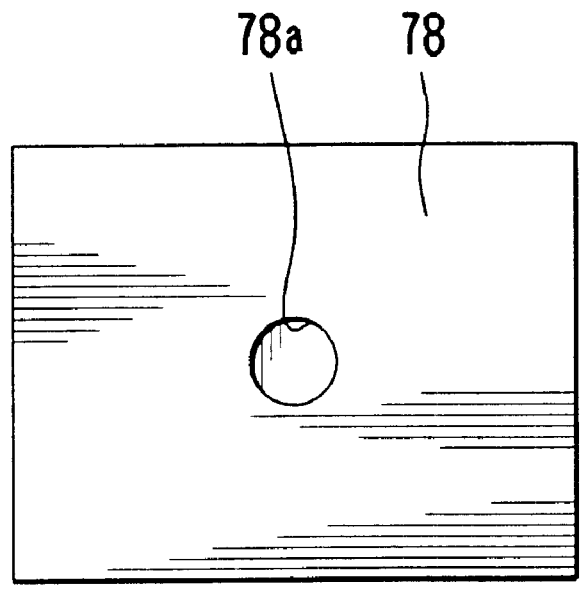
FIG. 24 is a top plan view for showing a shape of a mask and a shape of a substrate.
Figure 24B:
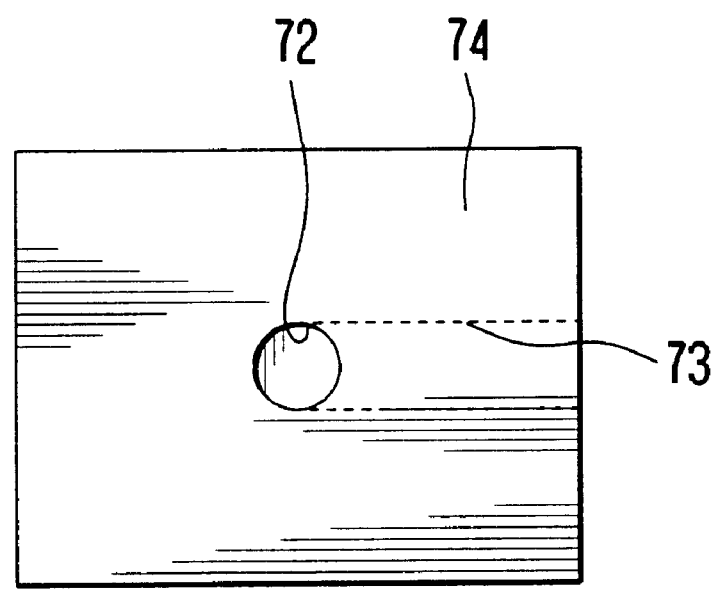

Referring to FIGS. 23 and 24, a twelfth preferred embodiment of the present invention will be described. This preferred embodiment relates to a method for manufacturing the aforesaid T-type fluid joint 71. At first, as shown in FIG. 23(a), the etching masks 78, 79 for use in forming the hole and the flow passage are formed at both surfaces of the substrate 74 (74a, 74b) of glass plate with resist, the substrate 74 is etched from both surfaces under application of the flow passage etching masks 78, 79, thereafter the resists of the etching masks 78, 79 are removed as shown in FIG. 23(b), whereby the hole 72 (72a, 72b) and an approximate U-shaped flow passage (groove) 73 (73a, 73b) are formed. With such an arrangement as above, the substrate 74 formed with the hole 72 and the flow passage 73 can be attained. FIG. 24(a) illustrates a shape of top plan view of the etching mask 78 having the predetermined etching pattern 78a formed therein and FIG. 24(b) illustrates a shape of top plan view of the substrate 74 having the hole 72 and the flow passage 73 formed under application of etching operation.

Then, the metallic projection 75 (75a, 75b) (pipes) is formed under application of the resin die forming step, the hollow metallic projection (pipe) forming step by plating and the resin die removing step as described above with respect to the substrate 74 (FIG. 23(c)).

In this way, the two substrates 74 having the metallic projection 75 (75a, 75b) formed therein, i.e. the two joints are aligned to each other and connected by a fluoric acid bonding under an adhesive-less state as shown in FIG. 23(d), and the connecting surfaces 76 are polished to complete the T-type fluid joint 71.

That is, in accordance with the preferred embodiment, the joints as shown in FIG. 23(c) are connected to each other to enable the joint having a new shape to be manufactured. In addition, after the hollow metallic projections 75a, 75b are formed in the same manner as that described above, both joints are connected to enable the resin removing step to be simplified.

Referring to FIGS. 25 to 28, a thirteenth preferred embodiment of the present invention will be described. This preferred embodiment is made such that, although its detailed portions are eliminated, the same type of or different types of fluid joints are properly combined to each other to manufacture various kinds of tube couplings as the fluid joint where the hollow metallic projections are integrally formed at the substrate having the hole by the manufacturing method described above.

Figure 14A:
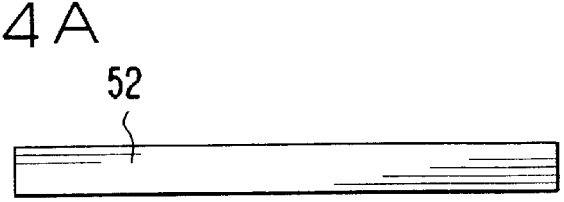
FIG. 14 is a sectional view for showing in order the manufacturing steps.
Figure 14B:
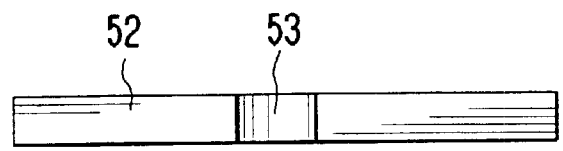
Figure 14C:
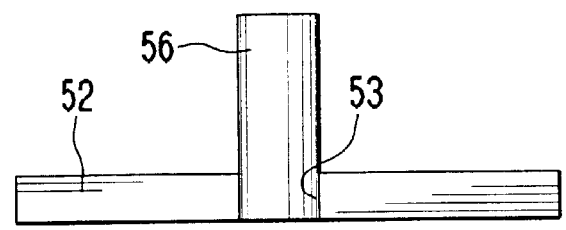
Figure 14D:
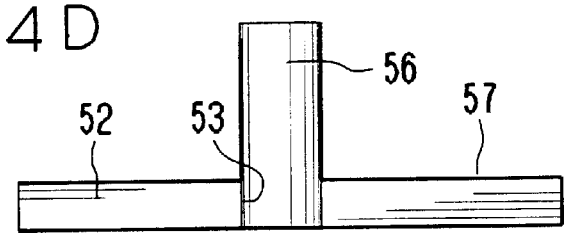
Figure 14E:
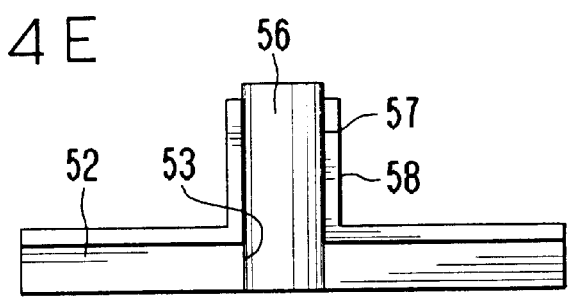
Figure 25A:
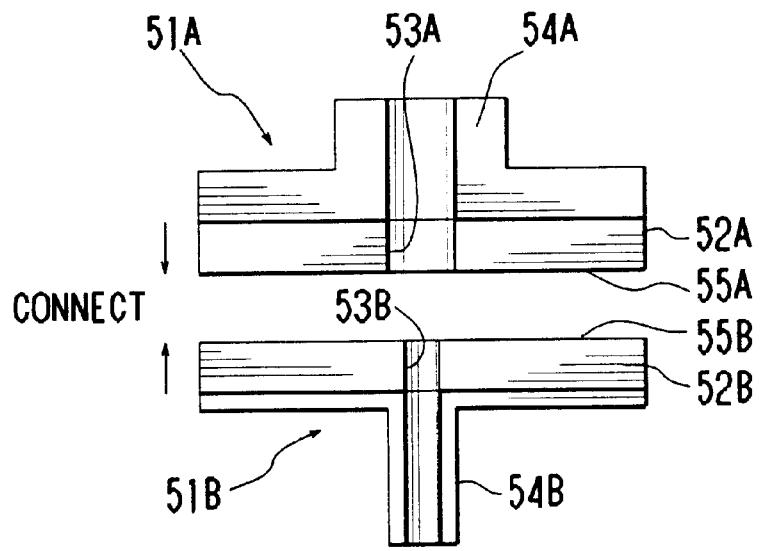
FIG. 25 is a sectional view for illustrating an example of configuration of a tube coupling of a thirteenth preferred embodiment of the present invention.
Figure 25B:
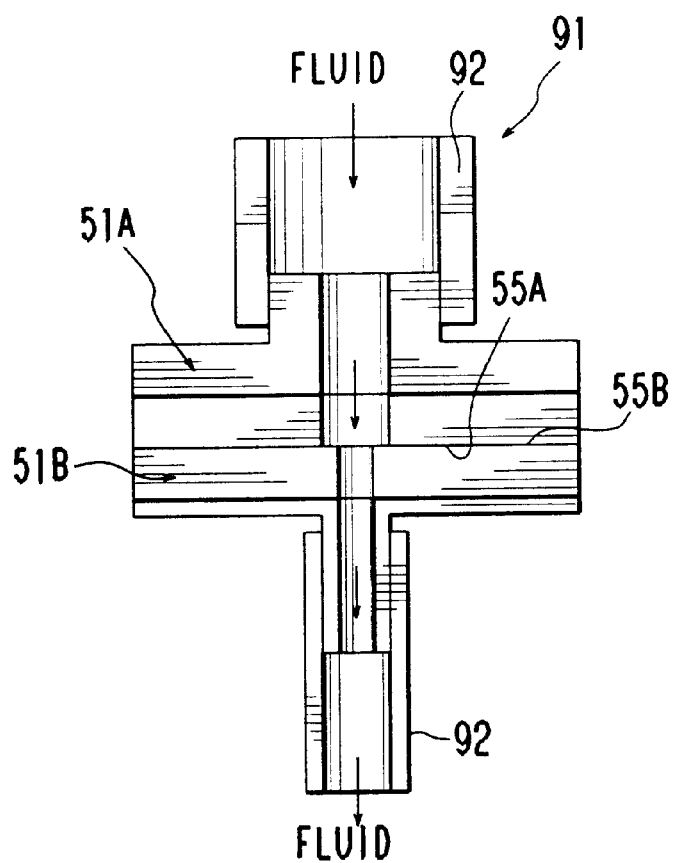
Figure 26A:
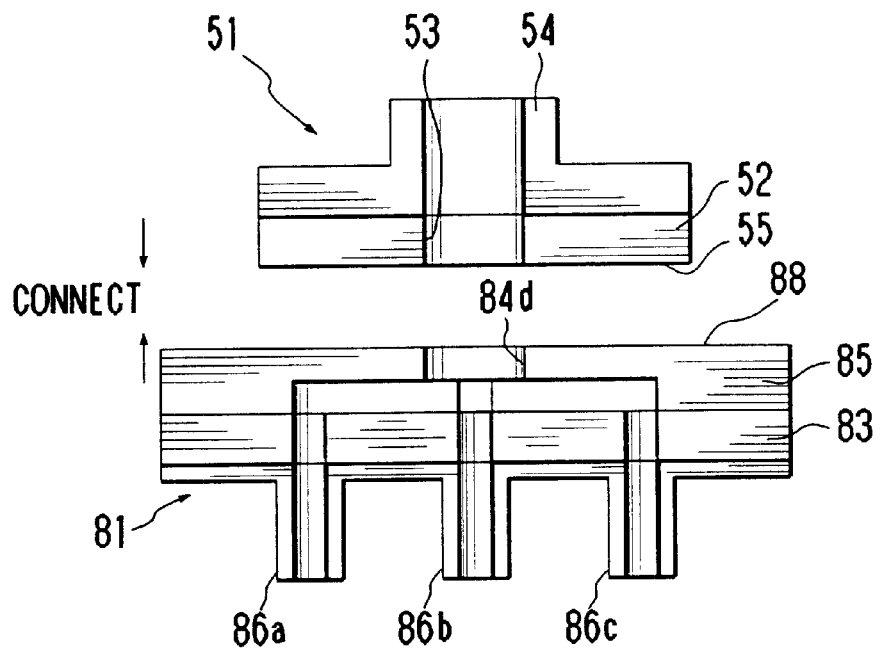
FIG. 26 is a sectional view for showing an example of configuration of a multiple tube coupling of a thirteenth preferred embodiment of the present invention.
Figure 26B:
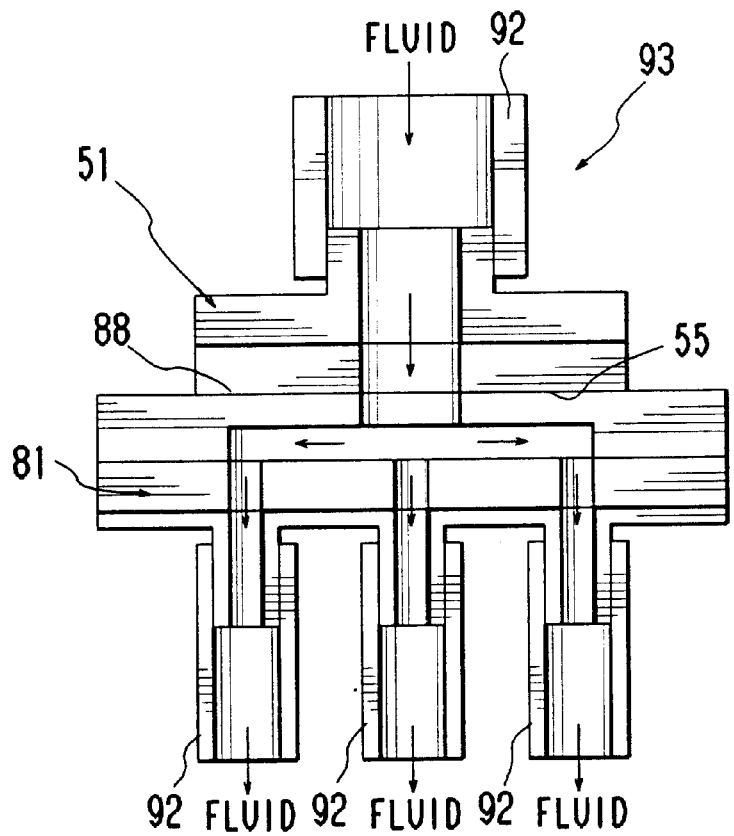

In FIG. 25, structure is like one as shown in FIG. 14(e). The connecting surfaces 55A, 55B of the two fluid joints 51A, 51B having simple shape with different diameters of the holes 53A, 53B are aligned to each other, connected under an adhesive-less state to manufacture the tube coupling 91. Reference numerals 54A, 54B denote the hollow metallic projections formed with a film thickness being made different in response to the diameters of the holes 53A, 53B, and each of the tubes 92 is inserted. FIG. 26 shows that the connecting surface 55 of the fluid joint 51 having a simple shape with the structure shown in FIG. 14(e), for example, and the connecting surface 88 of the multiple fluid joint 81 having the structure shown in FIG. 16(c) are aligned to each other, connected under an application of adhesive-less state to manufacture the multiple tube coupling 93.

Figure 27A:
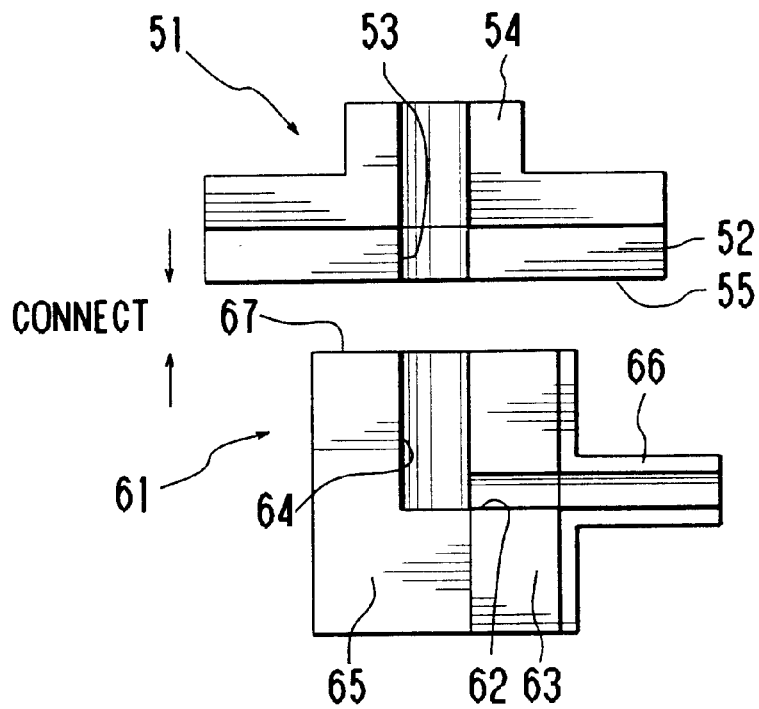
FIG. 27 is a sectional view for showing an example of configuration of an L-shaped tube coupling of a thirteenth preferred embodiment of the present invention.
Figure 27B:
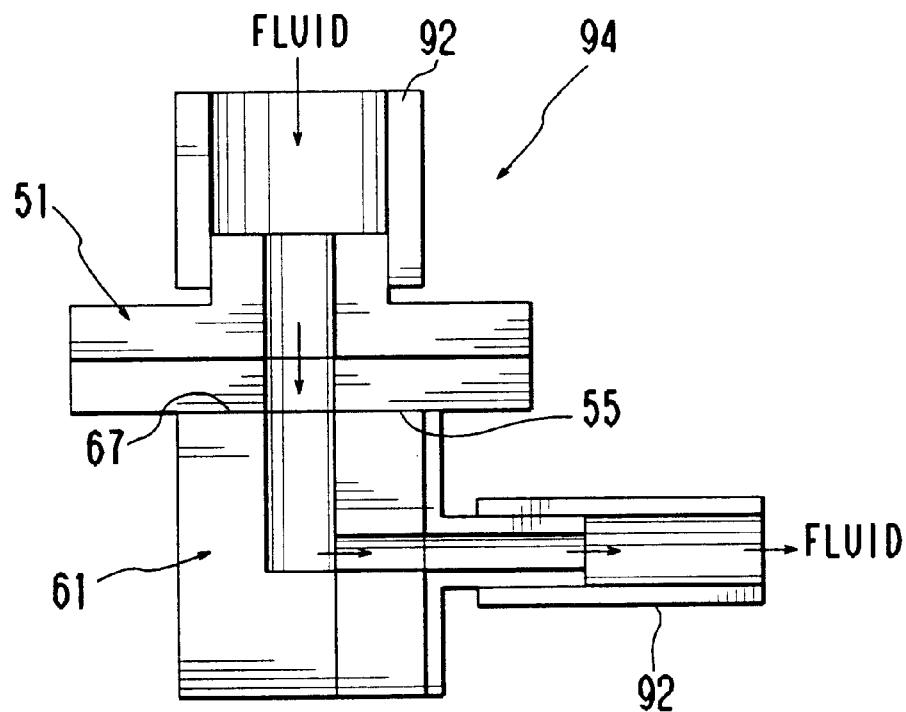

FIG. 27 shows that the connecting surface 55 of the fluid joint 51 having a simple shape with the structure shown in FIG. 14(e), for example, and the connecting surface 67 of the multiple fluid joint 61 having the structure shown in FIG. 16(a) are aligned to each other, connected under an application of adhesive-less state to manufacture the L-shaped tube coupling 94.

Figure 28A:
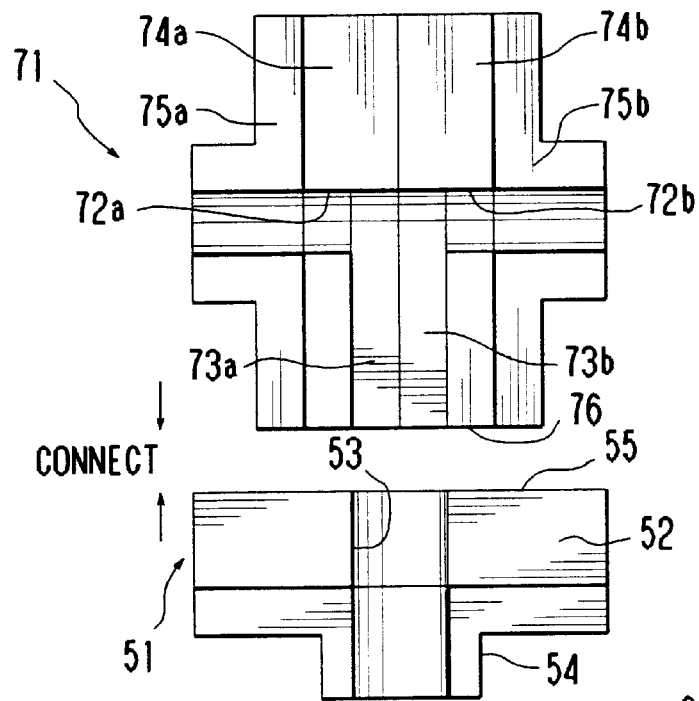
FIG. 28 is a sectional view for showing an example of configuration of a T-shaped tube coupling of a thirteenth preferred embodiment of the present invention.
Figure 28B:
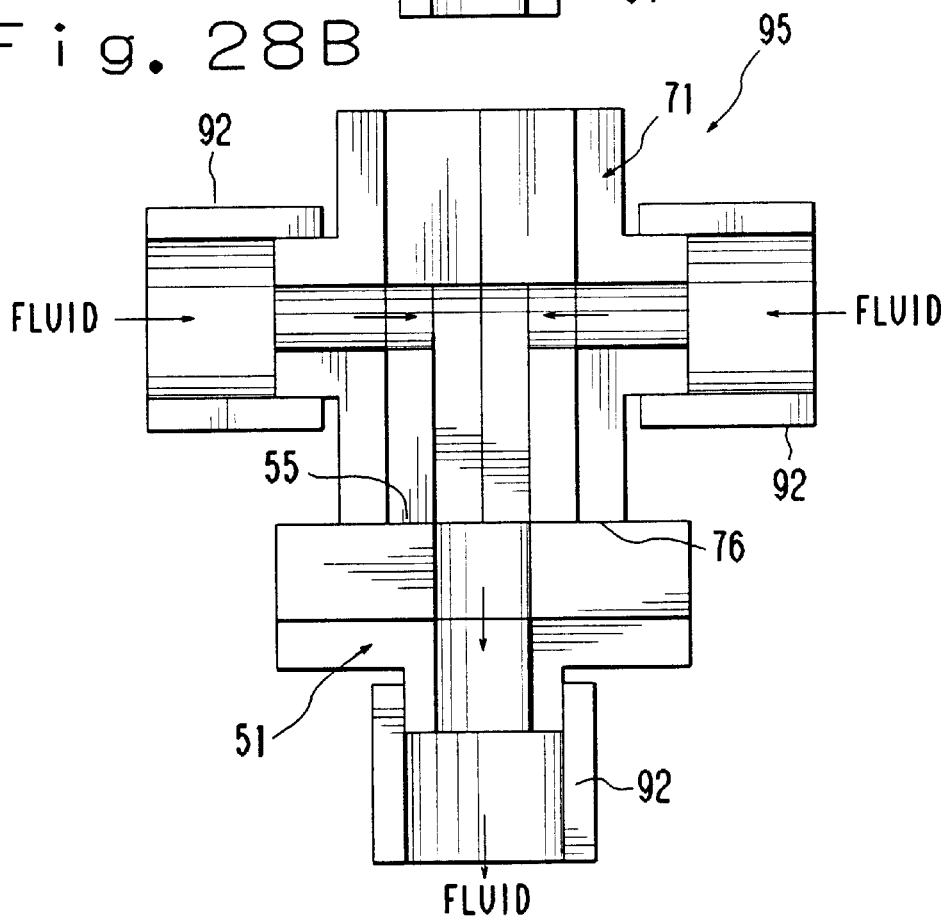
Figure 29A:
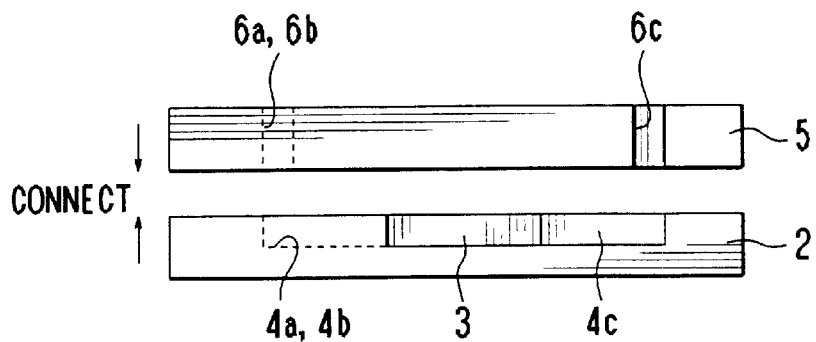
FIG. 29 is a sectional view for showing in order of manufacturing steps of a micro-reactor of a fourteenth preferred embodiment of the present invention.
Figure 29B:
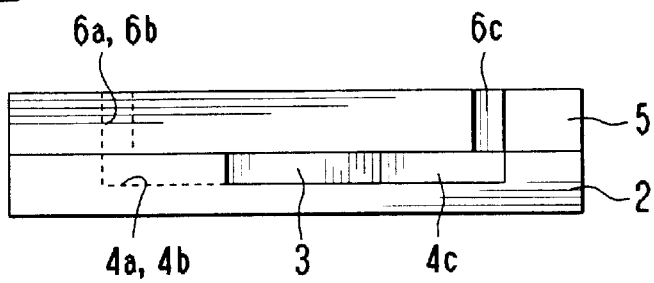
Figure 29C:
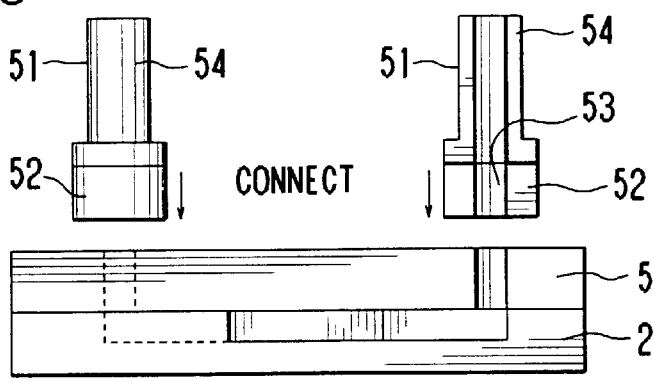
Figure 29D:
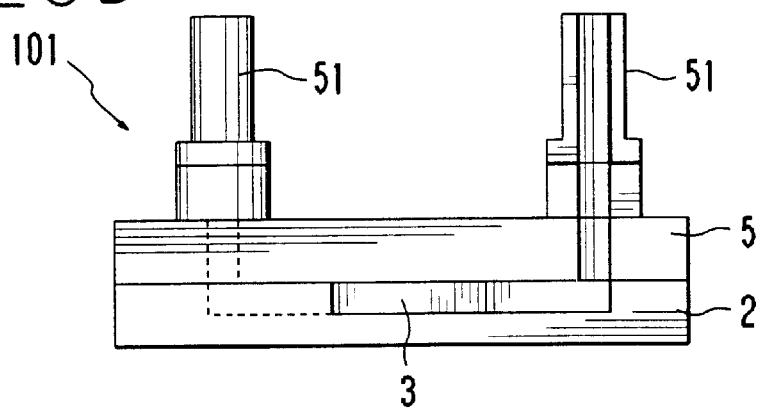

FIG. 28 shows that the connecting surface 80 of the T-shaped fluid joint 71 with the structure shown in FIG. 16(b), for example, and the connecting surface 55 of the fluid joint 51 of simple shape having the structure shown in FIG. 14(e) are aligned to each other, connected under an application of adhesive-less state to manufacture the T41 shaped tube coupling 95.

That is, in accordance with the present preferred embodiment, the simple couplings (fluid joints) are connected to each other to enable the complex tube couplings 91, 93, 94 and 95 to be manufactured. Connection of these joints can be carried out under an application of adhesive-less state. Formation of resin die under optical formation and formation of fine hole and groove with the MEMS machining technology enable the tube coupling having quite small inner and outer diameters of the pipe and having a quite small entire outer shape to be manufactured.

Figure 30A:
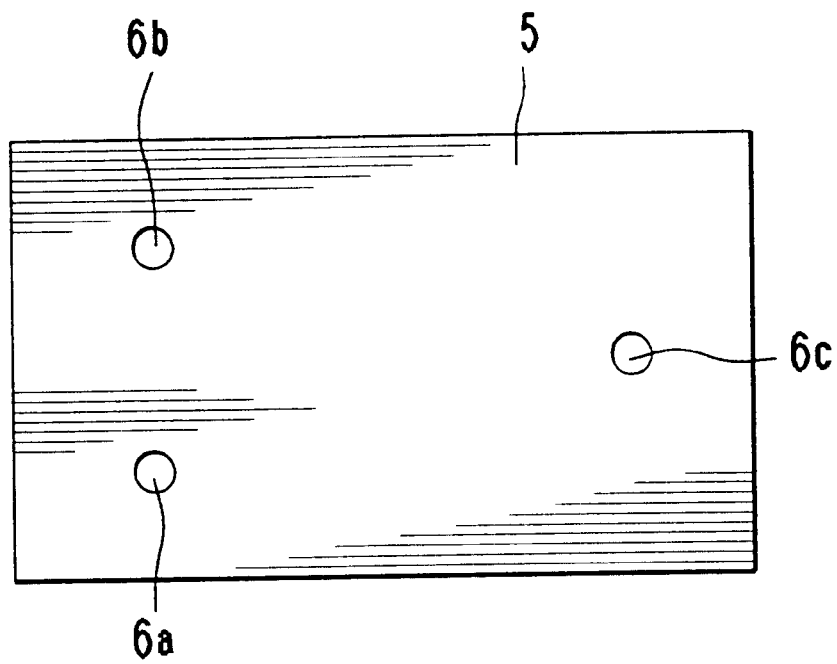
FIG. 30 is a top plan view for showing a lid and a base.
Figure 30B:
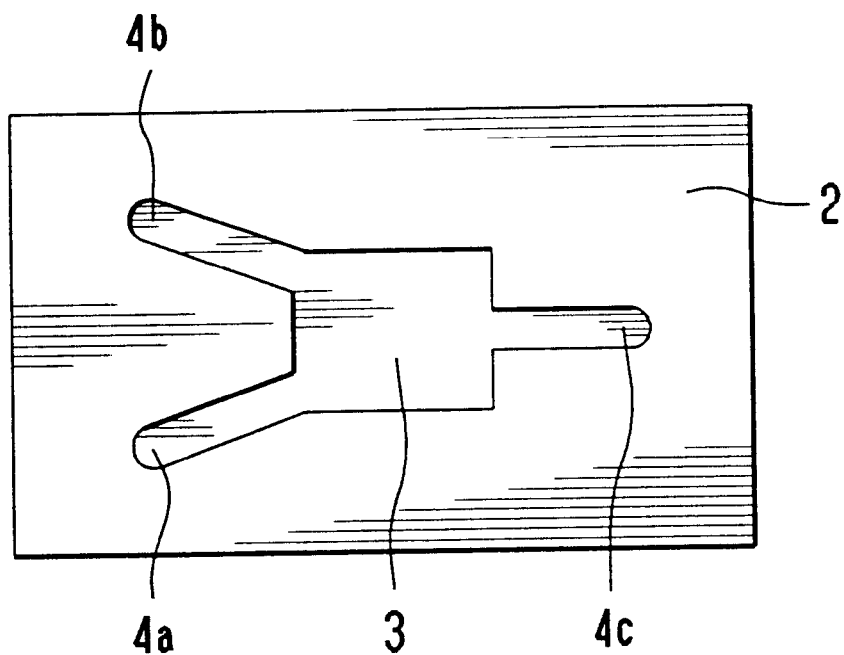

Referring to FIGS. 29 and 30, a fourteenth preferred embodiment of the present invention will be described. This preferred embodiment illustrates an example of application to the micro-reactor 101 that is one of the fluid devices. A basic formation of the device configuration of the micro-reactor 101 is similar to that shown in FIGS. 1(a) and 2, wherein the base 2 and the lid 5 are connected to constitute the outer enclosure. That is, it has inlets 6a, 6b and outlet 6c, and the outer enclosure closing the reactor 3 acting as the fluid function segment is formed by the base 2 and the lid 5. This preferred embodiment is made such that the connecting surface 55 of the micro fluid joint 51 composed of the structure shown in FIG. 14(e) is connected to the front surfaces of each of the holes 6a, 6b, 6c of the connector to complete the micro-reactor 101.

Since the aforesaid micro-fluid joint 51 is quite small in size, it becomes possible to reduce a size of the entire micro-reactor 101 as compared with that of adhering the commercially available joint of the prior art. In addition, in the case of the connection of the micro-fluid joint 51, special adhesive agent (si-top) can also be used and the connection of adhesive-less state such as a fluoric acid bonding and an anodic bonding may also be applicable.

As the manufacturing method, after the lid 5 and the base 2 of the micro-reactor 101 are manufactured, these lid 5 and the base 2 are connected and then the micro-fluid joint 51 is corresponded to each of the holes 6a, 6b and 6c and connected under application of adhesive-less state. Since the resin die 8 is removed at the manufacturing stage of the micro-fluid joint 51 as compared with that of the micro-reactor 1 of the first preferred embodiment, it may provide a merit that cleaning of the reactor 3, the flow passages 4a, 4b and 4c are scarcely needed.

Figure 32A:
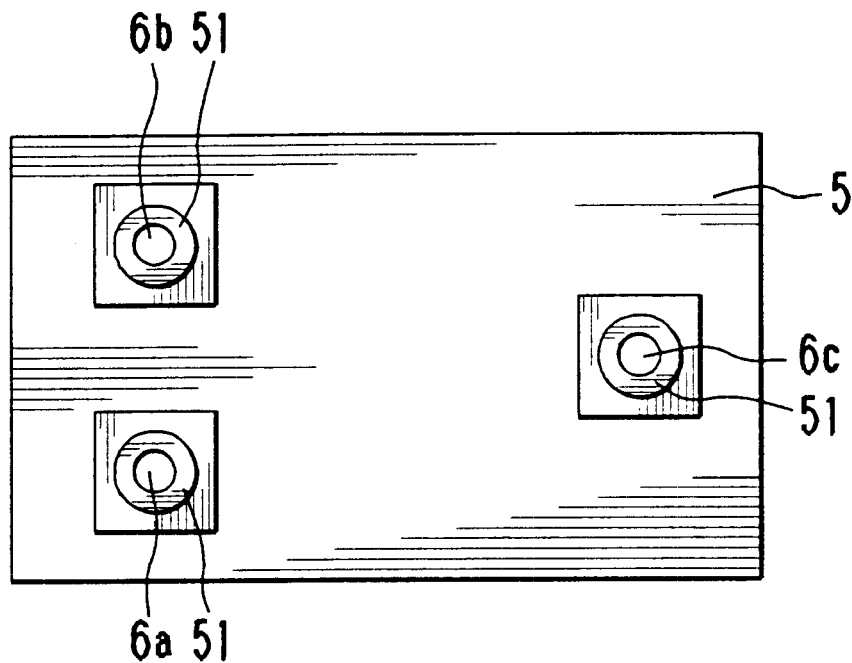
FIG. 32 is a top plan view for showing a lid and a base after its joint connection.
Figure 32B:
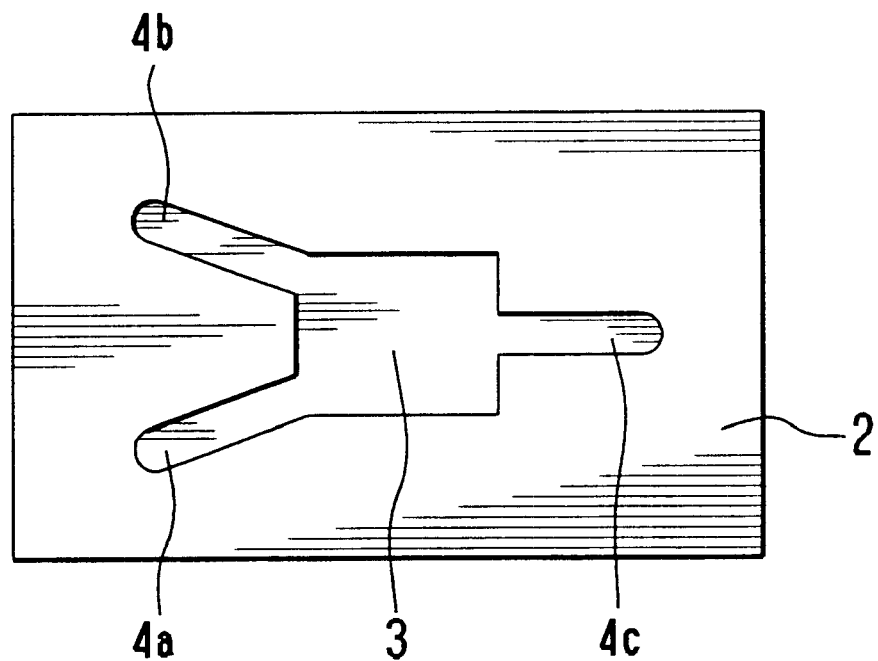
Figure 33A:
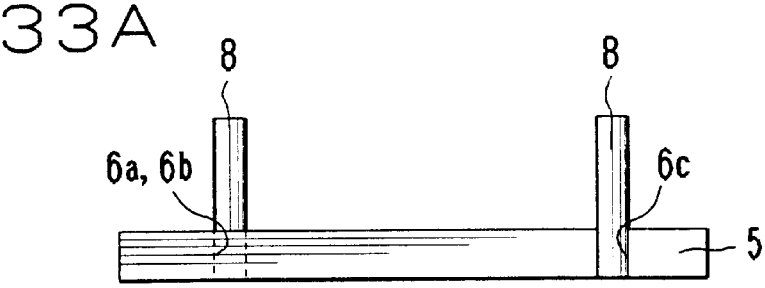
FIG. 33 is a sectional view for showing in order of manufacturing steps for a micro-reactor of a sixteenth preferred embodiment of the present invention.
Figure 33B:
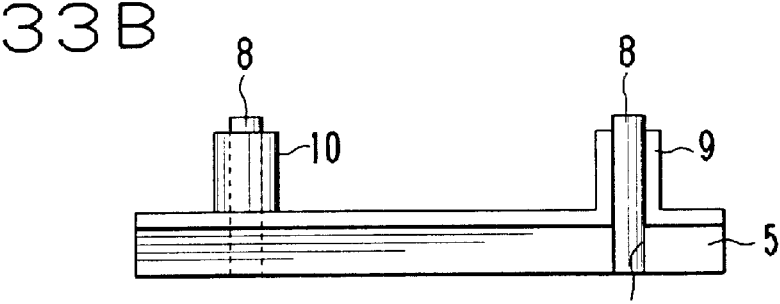
Figure 33C:
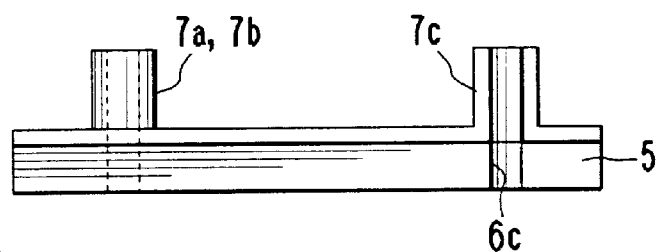
Figure 33D:
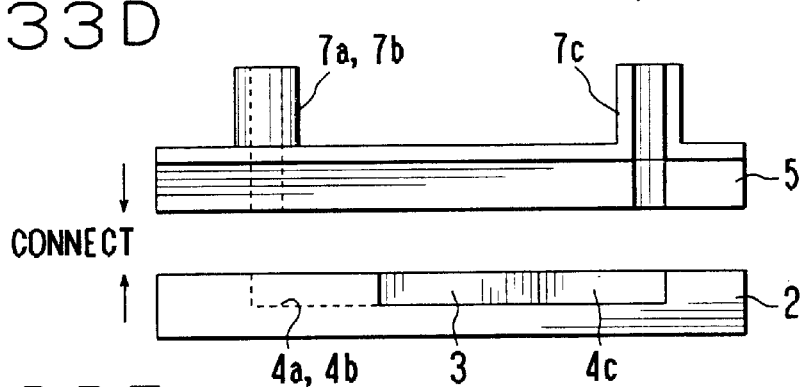
Figure 33E:
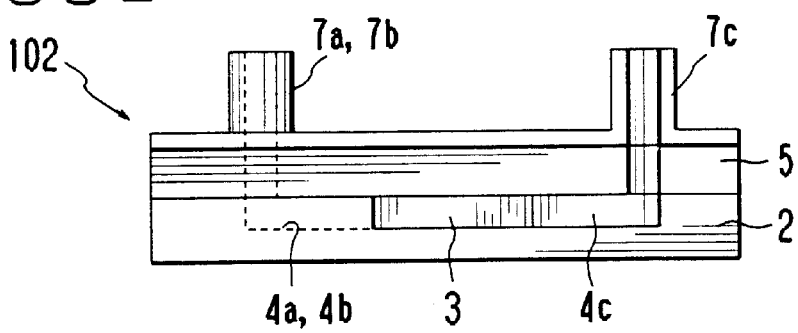

Referring to FIGS. 31 and 32, a fifteenth preferred embodiment of the present invention will be described. This preferred embodiment also illustrates an example of application to the micro-reactor 101 that is one of the fluid devices. That is, as a result, this preferred embodiment may manufacture the micro-reactor 101 that is similar to the fourteenth preferred embodiment, although the manufacturing process is made different in such a way that the micro-fluid joint 51 is corresponded to each of the holes 6a, 6b, 6c and connected to the lid 5 under an application of adhesive-less state, thereafter the lid 5 is connected to the base 2.

That is, in order to connect the micro-fluid joint 51, the micro-fluid joint 51 is aligned with each of the holes 6a, 6b, 6c formed at the lid 5, fluoric acid (about 1%), for example, is dripped near the connecting surface 55 (it enters a clearance due to capillary action), thereafter a pressing force is added to the micro-fluid joint 51 and the joint is heated under the state in which the pressing force is applied. FIG. 32(*a*) is a top plan view for showing the lid 5 to which the micro-fluid joint 51 is connected.

Since the micro-reactor 101 of the preferred embodiment does not have any fine structure and is simple (not complicated), there occurs no problem in particular and the complex fluid device having a more fine structure has sometimes an occasion that the inside of the device is damaged under application of the pressing force, so that in the case of the preferred embodiment, at first the micro-fluid joint 51 is connected to each of the holes 5a, 5b, 5c under the state of single lid 5, thereafter the lid 5 to which the micro-fluid joint 51 is connected and the base 2 are connected to each other.

Figure 34A:
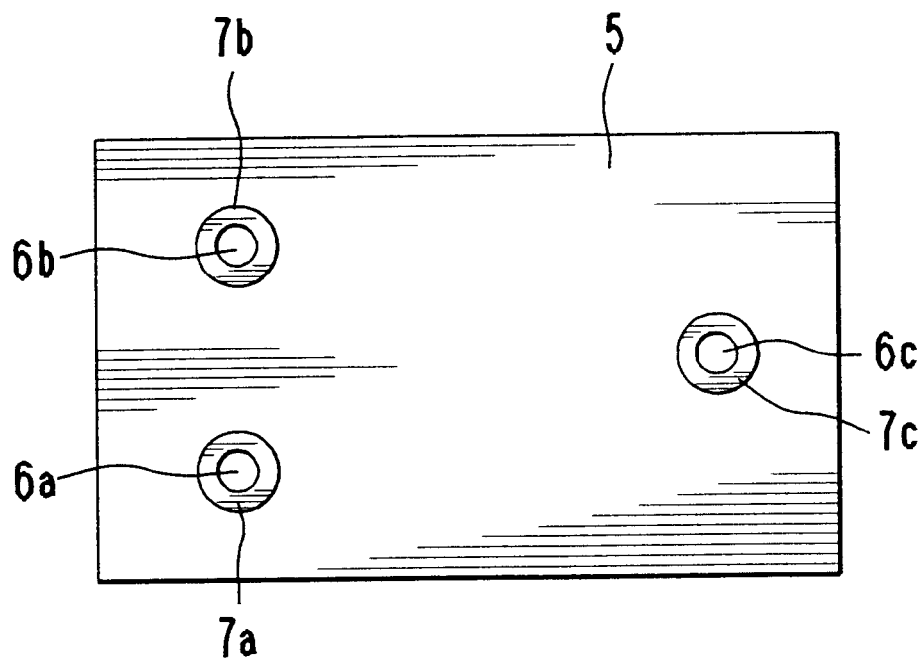
FIG. 34 is a top plan view for showing a lid and a base after the metallic projections are manufactured.
Figure 34B:
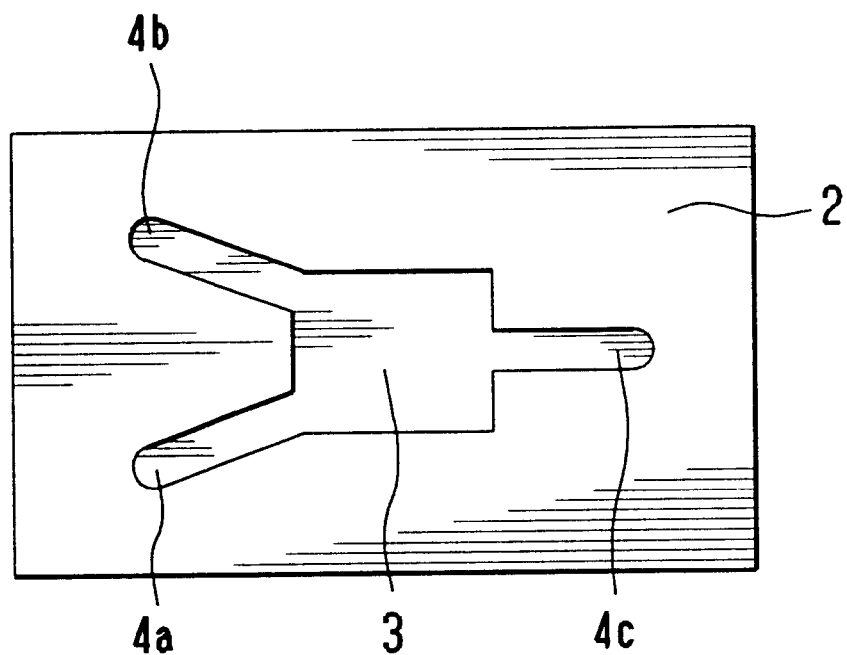

Referring to FIGS. 33 and 34, a sixteenth preferred embodiment of the present invention will be described. This preferred embodiment also illustrates an example of application for the micro-reactor 102 that is one of the fluid devices.

In this preferred embodiment, the resin die 8 is formed at each of the holes 5a, 5b, 5c by the same manufacturing method as that shown in FIG. 1 under a state of unit of the lid 5, and the sheath layer 9 and the electrolysis plating layer 10 are formed in sequence, the resin die 8 is removed, whereby the hollow metallic projection 7 is directly formed. FIG. 34(*a*) is a top plan view for showing the lid 5 formed with the metallic projection 7.

The lid 5 formed with such a metallic projection 7 is connected onto the base 2 to complete the micro-reactor 102.

As described above, although it takes a quite long manufacturing time for connecting the micro-fluid joint 151 to each of the holes 5a, 5b, 5c, in accordance with the preferred embodiment of the present invention, the hollow metallic projection 7 is manufactured concurrently by plating operation and the lid 5 formed with inlet and outlet is connected to the base 2, so that processing can be attained in a short time and further, due to provision of the metallic projection 7 (inlet, outlet) having a heat-resistant characteristic, the connection with the base 2, the anodic bonding and the fluoric acid bonding can be carried out.

Figure 35A:
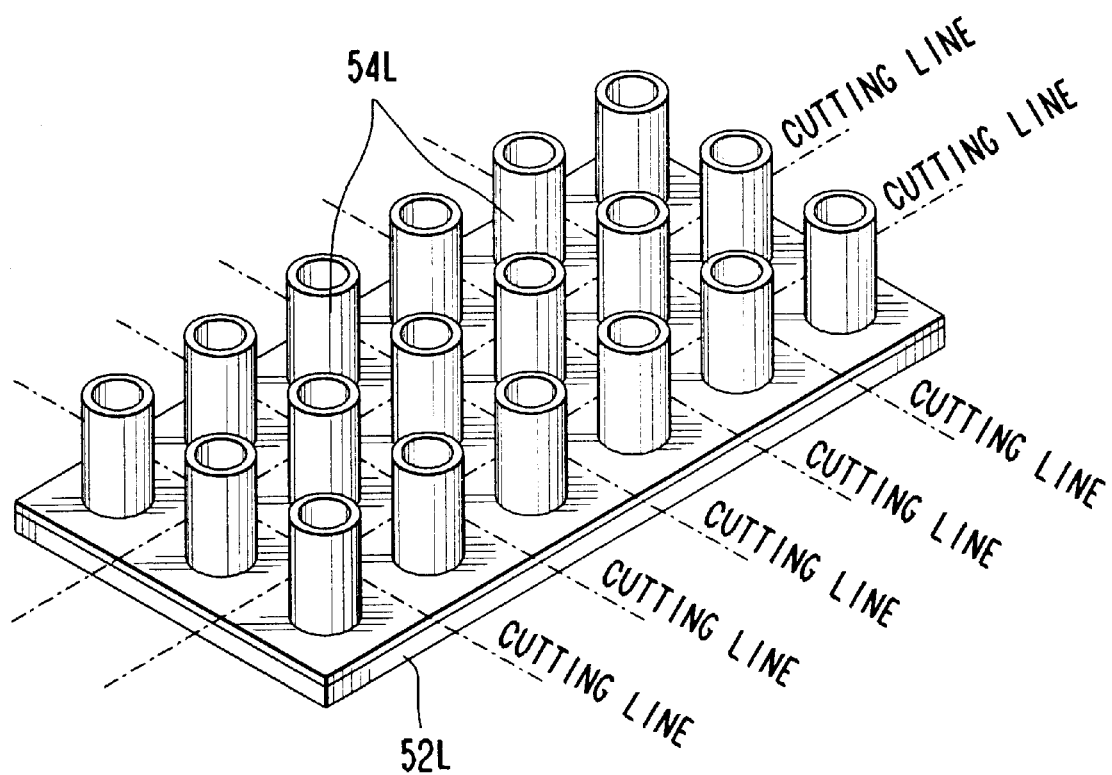
FIG. 35 is a perspective view for illustrating a process of taking multiple micro-fluid joints of an seventeenth preferred embodiment of the present invention.
Figure 35B:
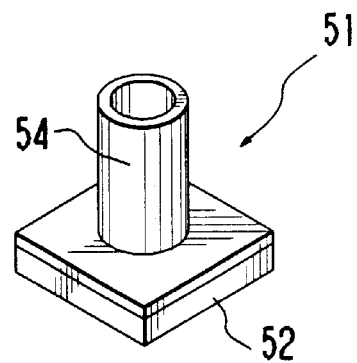

Referring to FIG. 35, a seventeenth preferred embodiment of the present invention will be described. This preferred embodiment relates to the method for manufacturing the micro-fluid joint 51, and in particular, several joints can be taken.

That is, when the micro-fluid joint 51 is manufactured one by one in a separate manner, its manufacturing cost is quite expensive. However, in the preferred embodiment, a large-sized substrate 52L formed with many holes (not shown) is prepared, the resin die (not shown) is manufactured in compliance with the respective hole at the substrate 52L (it is desired to use the photo-mask coincided with several holes), the metallic projection 54L as shown in FIG. 35(*a*) is formed through the sheath layer by the plating step, a forming step of electrolysis plating phase and a resin removing step, thereafter each of the elements is cut at a cutting line shown in FIG. 35(*a*) so as to attain the respective micro-fluid joint 51 as shown in FIG. 35(*b*). In accordance with this process, manufacturing cost of the micro-fluid joint 51 can be substantially reduced.

Figure 36A:
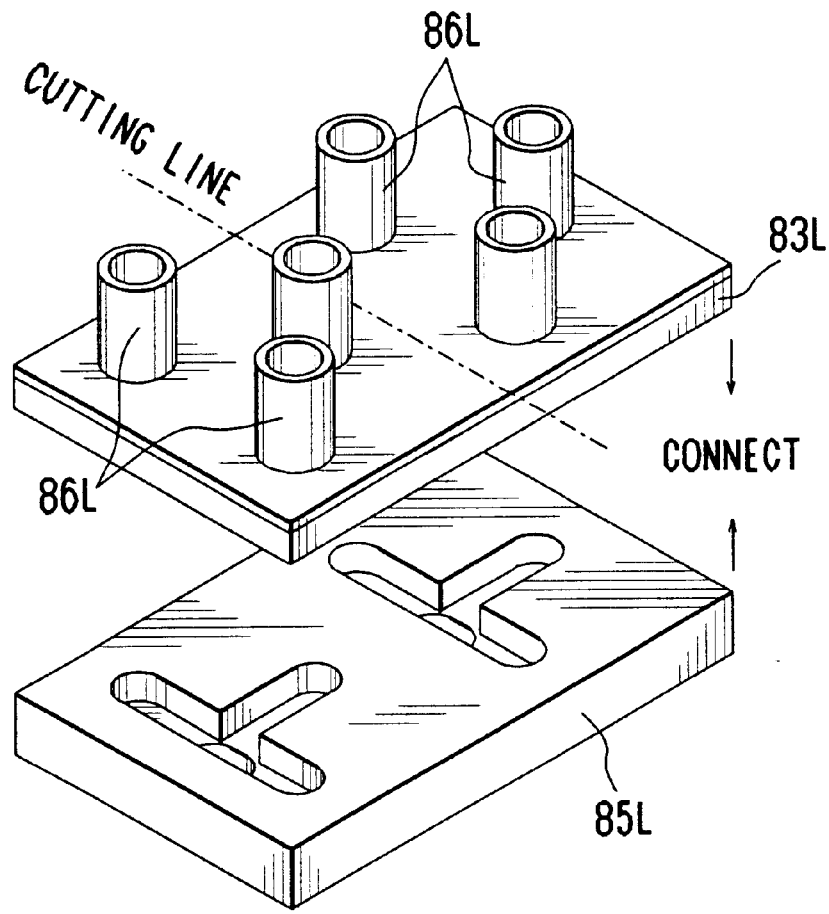
FIG. 36 is a perspective view for showing an example of application for the multiple fluid joint.
Figure 36B:
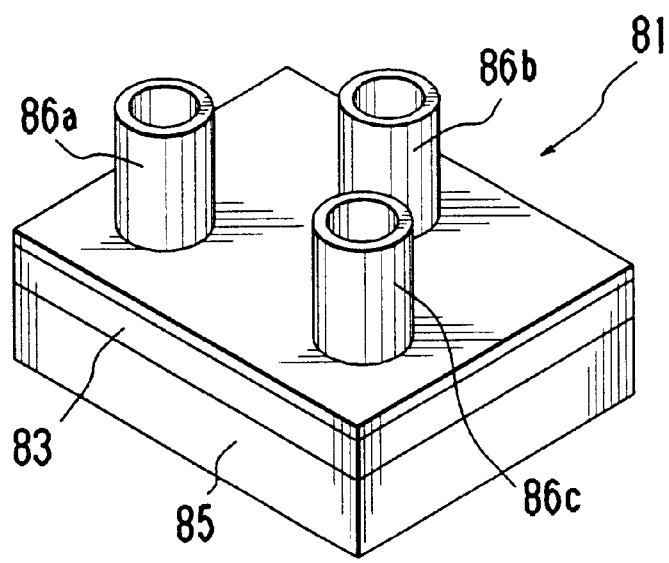

It is not limited to the simple micro-fluid joint 51, but many elements can be taken as for other fluid joints. For example, in the case of the multiple type fluid joint 81 as shown in FIG. 16(*c*), the resin dies are manufactured at many holes as shown in FIG. 36 (it is desired to use the photo-masks coincided with many holes), the plating step and the resin removing step are carried out, the substrate 83L formed with many pairs of hollow metallic projections 86L are connected with another substrate 85L formed with many flow passages (grooves) and holes or the like, thereafter each of the elements is cut at the portions indicated by the cutting lines as shown in FIG. 36(*a*) and then respective multiple fluid joint 81 shown in FIG. 36(*b*) is attained. With such an arrangement as above, manufacturing cost of the multiple fluid joint 81 can be substantially reduced.

FIG. 36 illustrates the case of the multiple-type fluid joint 81. However, it can be also applied to the micro reactor (fluid device), various kinds of micro-fluid joints and various kinds of tube couplings, as well. Upon completion of total assembly of batch processing, the assembly is divided into respective devices and the device cost can be substantially decreased.

Figure 37A:
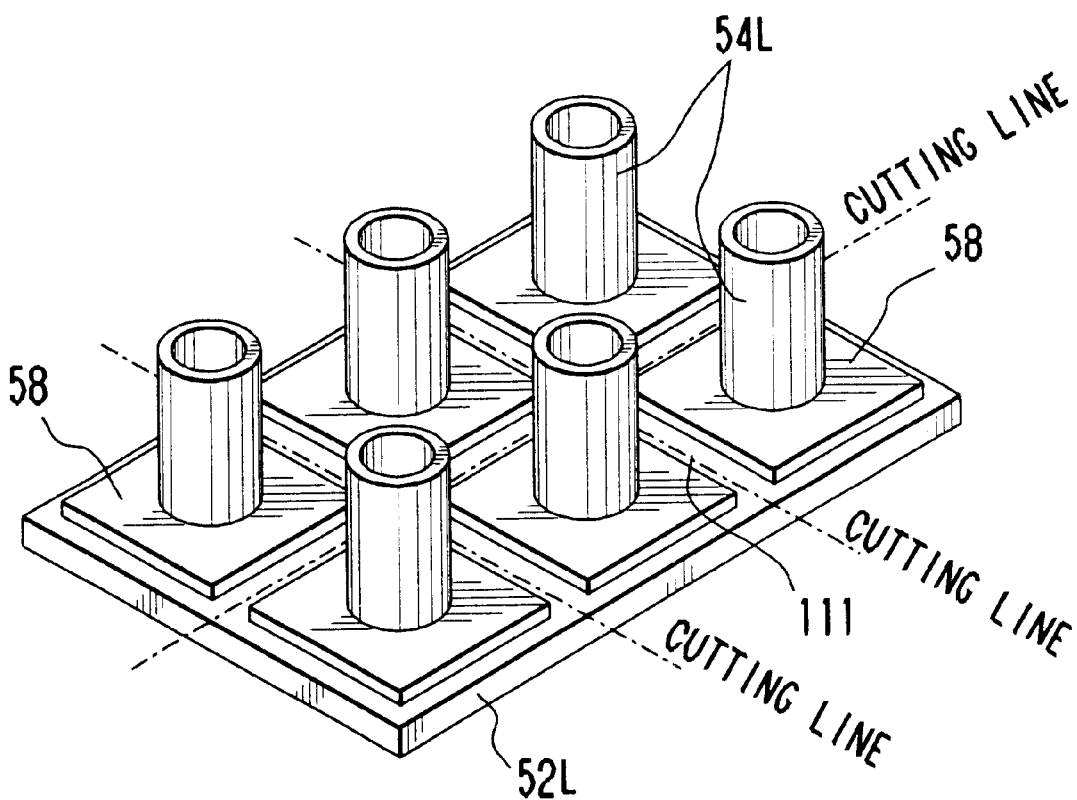
FIG. 37 is a perspective view for illustrating a process of taking multiple micro-fluid joints of an eighteenth preferred embodiment of the present invention.
Figure 37B:
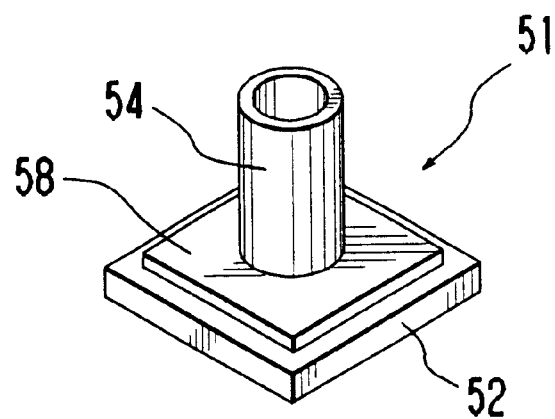

Referring to FIG. 37, an eighteenth preferred embodiment of the present invention will be described. This preferred embodiment also relates to a method for manufacturing the micro-fluid joint 51, wherein in particular, several devices can be taken. Basically, this is similar to the case described in reference to FIG. 35. However, the non-plated forming part 111 is arranged such that the electrolysis plating layer 58 is not formed at an individual cut and divided location.

In the case that the major composing elements are made of inorganic material, a dicing device is normally used when these substrates 52L or the devices are cut and divided. However, if the electrolysis plating layer 58 (metallic film) is present at a dicing location in a film thickness of several hundred $\mu$m, the dicing step becomes quite difficult to perform. In addition, the metallic film has a quite sticky state as compared with that of glass (also including quartz) of inorganic material and silicon, bites into the blade (the blade for use in shearing operation) to produce a remarkable wearing of the blade. In the case of the worst situation, the blade may be torn out. In view of this fact, in the preferred embodiment, the plating film is not formed at least at the cutting location. In the case that the plating film is not present, the cutting for dividing it into respective devices may be facilitated and the wearing of the blade as well as its breakage can be remarkably reduced.

Figure 38A:
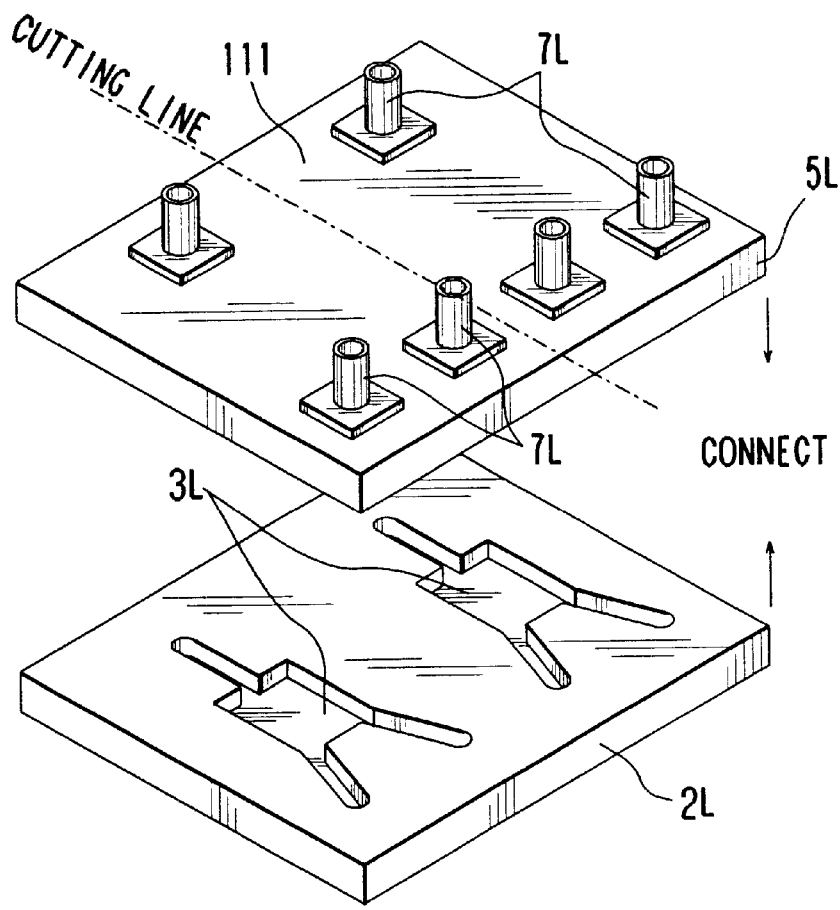
FIG. 38 is a perspective view for showing an example of developed application.
Figure 38B:
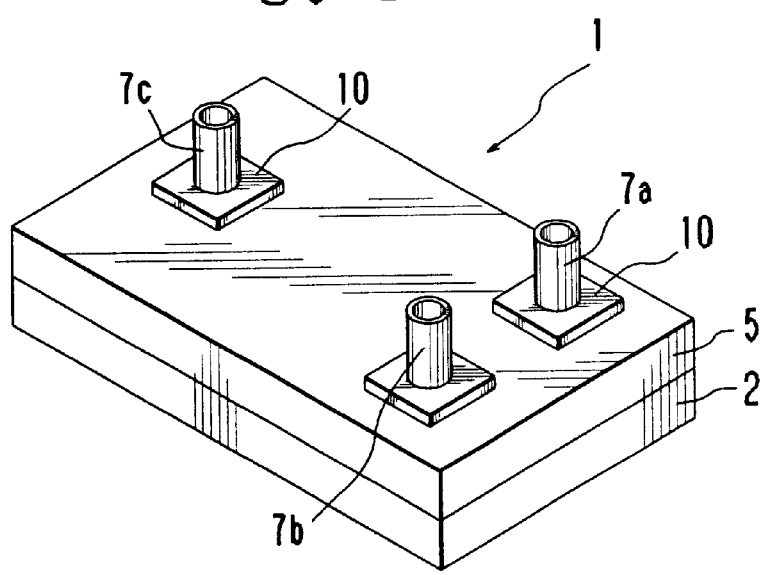

FIG. 38 shows the case that such a concept is further developed and this is applied to the micro-reactor 1 described in reference to FIG. 3. That is, the transparent lid 5L formed with many hollow metallic projections 7L and the base 2L formed with several flow passages (grooves) and the reactor or the like are connected to each other and, thereafter, they are divided into respective micro-reactors 1. However, the locations of the cutting segments and the reactor 3 are formed with a non-plating forming part 111 in such a way that the plating is not formed. With such an arrangement as above, in combination with the aforesaid effects, it is also possible to perform a visual inspective or optical analysis of the reactor 3 described in reference to FIG. 3. In addition, breakage of fine inner structure as well as a warp of the device caused by the inner stress at the plating film can be reduced.

In the case of manufacturing the fluid device (a micro-reactor, a micro-fluid joint and a tube coupling and the like) formed by connecting the aforesaid multi-layer substrate, it is required to have a permanent reliability with respect to the fluid leakage that is most important for the fluid device. As to the inlet and outlet, they are grown by plating, so that its reliability is quite high. Due to this fact, the location where the last connecting part is a connection between the substrates. The connection between the substrates is performed by the fluoric acid bonding in adhesive-less state, anodic bonding and a direct bonding, whereby reliability against the fluid leakage over the entire device can be increased to be quite high.

The fluid device in the aforesaid preferred embodiments has been described in reference to the example in which the reactor 3 is formed at the base 2 as the fluid function part, although the fluid function part is not limited to the reactor, but it may have a configuration in which the mixer, valve or pump and the like are installed at the base.

Obviously, numerous modifications and variations of the present invention are possible in light of the above teachings. It is therefore to be understood that within the scope of the appended claims, the invention may be practiced otherwise than as specifically described herein.

What is claimed is:

1. A method for manufacturing a pipe joint comprising the steps of:

filling resin in at least an inside of a hole passed through a substrate and opened at the substrate's surface and forming a resin die projected out of the surface of the substrate;

forming a layer-form member integrally at the surface of the substrate and side surface of the resin die; and after forming the layer-form member, removing the resin forming the resin die so as to integrally form a hollow projection communicating with the hole through the surface of the substrate.

2. A method for manufacturing a pipe joint according to claim 1, further comprising the step of:

forming a metallic layer integrally at the surface of the substrate and side surface of the resin die by plating.

3. A method for manufacturing a pipe joint according to claim 1, wherein the resin die is formed to have a tapered shape.

4. A method for manufacturing a pipe joint according to claim 1, wherein the resin die is formed to have a concave-convex shape in a passing through direction of the hole at its outer circumferential surface.

5. A method for manufacturing a pipe joint according to claim 1, wherein a UV curing resin is used as resin forming the resin die, and when the resin die is formed, the substrate is immersed in the liquid resin not yet cured, and the surface of the substrate is exposed to ultraviolet light, the resin is cured in a direction in which a UV exposed portion and the substrate are being moved away from each other while the UV exposed portion and the substrate are being moved away from each other to form the resin die projected out of the surface of the substrate.

6. A method for manufacturing a pipe joint according to claim 3, wherein a UV curing resin is used as resin forming the resin die, and when the resin die is formed, the substrate is immersed in the liquid resin not yet cured, and the surface of the substrate is exposed to ultraviolet light, the resin is cured in a direction in which a UV exposed portion and the substrate are being moved away from each other while the UV exposed portion and the substrate are being moved away from each other to form the resin die projected out of the surface of the substrate, and amounts per unit volume to expose the resin are set different in a height direction of the resin die by setting times to expose the resin differently to cause diameters of the resin die to be formed differently from each other.

* * * * *